United States Patent
Bargroff et al.

(10) Patent No.: US 9,219,557 B2
(45) Date of Patent: *Dec. 22, 2015

(54) CIRCUITS, SYSTEMS AND METHODS FOR CONSTRUCTING A COMPOSITE SIGNAL

(75) Inventors: Keith Bargroff, San Diego, CA (US); Jeremy Goldblatt, San Diego, CA (US)

(73) Assignee: Entropic Communications, LLC, Carlsbad, CA (US)

(*) Notice: Subject to any disclaimer, the term of this patent is extended or adjusted under 35 U.S.C. 154(b) by 1575 days.

This patent is subject to a terminal disclaimer.

(21) Appl. No.: 12/015,760

(22) Filed: Jan. 17, 2008

(65) Prior Publication Data

US 2008/0112385 A1 May 15, 2008

Related U.S. Application Data

(63) Continuation of application No. 11/934,484, filed on Nov. 2, 2007, now abandoned.

(60) Provisional application No. 60/864,352, filed on Nov. 3, 2006, provisional application No. 60/885,814, filed on Jan. 19, 2007, provisional application No. 60/886,933, filed on Jan. 28, 2007.

(51) Int. Cl.
*H04H 40/90* (2008.01)
*H04B 1/28* (2006.01)
*H04B 1/16* (2006.01)

(52) U.S. Cl.
CPC ............... *H04H 40/90* (2013.01); *H04B 1/16* (2013.01); *H04B 1/28* (2013.01)

(58) Field of Classification Search
CPC .................................. H04H 40/90; H04B 1/28
USPC ............................... 370/431; 455/3.02, 180.1
See application file for complete search history.

(56) References Cited

U.S. PATENT DOCUMENTS

| | | | | |
|---|---|---|---|---|
| 4,092,820 A | * | 6/1978 | Kume et al. | 368/188 |
| 4,675,732 A | * | 6/1987 | Oleson | 725/71 |
| 5,073,930 A | | 12/1991 | Green | |
| 5,276,904 A | | 1/1994 | Mutzig et al. | |
| 5,896,558 A | * | 4/1999 | Wiedeman | 455/12.1 |
| 5,959,592 A | | 9/1999 | Petruzzelli | |

(Continued)

FOREIGN PATENT DOCUMENTS

| EP | 0 800 314 | 10/1997 |
|---|---|---|
| EP | 1 089 469 | 4/2001 |

(Continued)

OTHER PUBLICATIONS

International Search Report from PCT application PCT/US2007/089192.

*Primary Examiner* — Dang Ton
*Assistant Examiner* — Mandish Randhawa
(74) *Attorney, Agent, or Firm* — McAndrews, Held & Malloy, Ltd.

(57) ABSTRACT

Circuits, systems, and methods for assembling a composite signal include a frequency translation circuit coupled to receive an input signal and operable to generate a plurality of frequency-translated versions of the input signal at a respective plurality of different frequencies, the plurality of frequency-translated input signals defining a group of frequency translated signals. The plurality of frequency translated signals may each be processed to provide a composite signal.

15 Claims, 14 Drawing Sheets

(56) References Cited

U.S. PATENT DOCUMENTS

| | | |
|---|---|---|
| 6,424,817 B1 | 7/2002 | Hadden et al. |
| 6,993,306 B2 * | 1/2006 | Buznitsky et al. ............ 455/259 |
| 7,130,576 B1 | 10/2006 | Gurantz et al. |
| 7,792,486 B2 * | 9/2010 | Petruzzelli .................. 455/3.02 |
| 8,009,725 B2 * | 8/2011 | Petrovic et al. ............... 375/220 |
| 8,300,681 B2 * | 10/2012 | Petrovic et al. ............... 375/220 |
| 2004/0029549 A1 | 2/2004 | Fikart |
| 2004/0209584 A1 | 10/2004 | Bargroff |
| 2004/0235415 A1 | 11/2004 | Atarashi |

FOREIGN PATENT DOCUMENTS

| | | |
|---|---|---|
| EP | 1 693 980 A2 | 8/2006 |
| WO | WO 02/51015 | 6/2002 |
| WO | 2005109703 A | 11/2005 |
| WO | 2006119397 A | 11/2006 |

\* cited by examiner

CIRCUITS, SYSTEMS AND METHODS FOR CONSTRUCTING A COMPOSITE SIGNAL

CROSS REFERENCE TO RELATED APPLICATIONS

This application is a continuation of U.S. patent application Ser. No. 11/934,484, filed Nov. 2, 2007, which claims the benefit of priority of each of the following applications:

U.S. provisional application No. 60/864,352, filed Nov. 3, 2006, entitled "Satellite Signal Frequency Translation and Stacking";

U.S. provisional application No. 60/885,814, filed Jan. 19, 2007, entitled "Circuits, Systems and Methods for Constructing a Composite Signal;" and U.S. provisional application No. 60/886,933, filed Jan. 28, 2007, entitled "Circuits, Systems and Methods for Frequency Translation and Signal Distribution." The contents of each of the above-identified patent application Ser. Nos. 11/934,484, 60/864,352, 60/885,814, and 60/886,933 are herein incorporated by reference for all purposes.

BACKGROUND

The present invention relates to circuits, systems and methods for processing signals, and particularly with circuits, systems and methods for constructing composite signals.

Composite signals are formed by assembling two or more signals into a combined signal spectrum, and find utility in many applications. For example, systems used to distribute satellite television signals often employ means to construct composite signals, whereby various channels or bands of channels originating from several different satellites are assembled into a composite signal over which a user's set top box or other receiver can tune. Switch matrices are often used in such systems, whereby a particular input signal (e.g., a Ku or Ka-band satellite signal) is supplied to an input of a switch matrix, and the switch matrix controlled so as to provide that signal to one or more of the switch matrix outputs. Two or more of such signals, each typically representing a different signal spectrum (i.e., containing different channels, or bands of channels) are combined (using, e.g., a diplexer or signal combiner network) and possibly frequency-translated to a second frequency (e.g., upper and lower L-band frequencies, 950-1450 MHz and 1650-2150 MHz), the combination of the two signals representing a composite signal that is supplied to a user for demodulation and/or baseband processing.

FIG. 1 illustrates a conventional satellite television distribution system operable to construct and distribute a composite output signal. The system is configured to receive signals from two satellite signal sources and to output two composite signals, each composite signal typically including a portion of each of the two satellite signals, and each composite signal supplied to a dual channel tuner (or two individual tuners). Each antenna receives two signals of different polarizations, typically having channel frequencies offset by half-channel width or having the same channel frequencies. In direct broadcast satellite (DBS) applications, the polarization is typically circular, having right-hand (R1 and R2) and left-hand (L1 and L2) polarized signals as labeled in FIG. 1. Signals can also be linearly polarized with horizontal and vertical polarizations.

The received signals are processed in a low noise block-converter 108 consisting of low noise amplifiers 107 (typically 2 or 3 amplifiers in a cascade), filters 109 (typically bandpass filters providing image rejection and reducing out of band power) and frequency converter block 110. The converter block 110, performing frequency downconversion, contains local oscillators LO1 114 and LO2 112 typically of the DRO (dielectric-resonator oscillator) types, mixers and post-mixer amplifiers. The two mixers driven by LO1 downconvert the signals to one frequency band (lower—L) while the mixers driven by LO2 downconvert to a different frequency band (higher—H). The L and H bands are mutually exclusive, do not overlap and have a frequency guard-band in between. The L and H band signals are then summed together in a separate combiner 116 in each arm, forming a composite signal having both frequency bands ("L+H", which is often referred to as a "band-stacked signal" when the added signal components are bands of channels, or a "channel-stacked signal" when the added signal components are individual channels) which is then coupled to a 2×4 switch matrix/converter block 120.

The switch matrix 130 routes each of the two input signals to selected one or more of the 4 outputs, either by first frequency converting the signals in the mixers 128 driven by LO3 132 or directly via the bypass switches around the mixers (the controls for the switch and mixer bypass not shown in the figure). The frequency of the LO3 is chosen such that the L-band converts into the H band, and vice versa, which is referred to as the "band-translation". This is accomplished when the LO3 frequency is equal to the difference of the LO2 and LO1 frequencies.

The outputs of the matrix switch/converter block 120 are coupled through diplexers consisting of a high-pass filter 122, low-pass filter 124 and a combiner 126 (as shown in the upper arm, the lower arm being the same) providing two dual tuner outputs 118 and 134. The filters 122 and 124 remove the undesired portion of the spectrum, i.e. the unwanted bands in each output. Each of the two outputs 118 and 134 feeds via a separate coaxial cable a dual tuner, for a total capability of four tuners. By controlling the matrix switch routing and the mixer conversion/bypass modes, a frequency translation is accomplished and each of the four tuners can independently tune to any of the channels from either polarization of either satellite.

While operational, the conventional system suffers from some disadvantages, one of which is the relatively low source-to-source isolation the system exhibits. In particular, the low noise converter block 108 and the switch matrix converter block 120 each may exhibit low isolation between their respective signal paths, which may lead to cross-coupling of the signals, and contamination of the composite signal with unwanted signal content. This cross-coupling effect becomes especially acute when the sources operate at high frequencies and over the same band, conditions which exist in the aforementioned satellite TV distribution system, whereby both satellite sources operate over the same Ku or Ka-band.

A further disadvantage of the conventional system is that multiple frequency translations are needed to provide the desired composite output signal. In particular, the low noise block converter 108 provides a first frequency translation, e.g., to downconvert the received satellite signal from Ku-band to L-band, and the switch matrix/converter 120 provides a second frequency translation, e.g., to translate the downconverted signal from a lower band to an upper band, or visa versa. Multiple frequency conversions increase the system's complexity, cost, and power consumption, as well as degrade signal quality.

SUMMARY

The present invention provides circuits, systems, and methods for assembling a composite signal. In accordance with one embodiment of the invention, a frequency translation circuit is described for use with a system operable to construct a composite signal. The frequency translation circuit is coupled to receive an input signal and operable to generate a plurality of frequency-translated versions of the input signal at a respective plurality of different frequencies, the plurality of frequency-translated input signals defining a group of frequency translated signals. The plurality of frequency translated signals may each be processed to provide a composite signal as described herein.

In another embodiment of the invention, a translational switch is described for use with a system operable to construct a composite signal. An exemplary embodiment of the translational switch includes a plurality of inputs, a first plurality of outputs, and a second plurality of outputs, each input configured to receive a respective one of a plurality of input signals. The exemplary translational switch further includes circuitry for switchably outputting, on any of the first plurality of outputs, either a first frequency-translated version of any one of the input signals, or a null output signal. The exemplary translational switch further includes circuitry for switchably outputting, on the second plurality of outputs, either a second frequency-translated version of any one of the input signals, or a null output signal.

In another embodiment of the invention, a system configured to construct a composite signal includes at least first and second translational switches, and a combining network. Each of the first and second translational switches are as described above, the first translational switch operable to receive a first signal and the second translational switch being operable to receive a second signal. The combining network includes inputs coupled to a respective one of the first and second translational switch outputs, and at least one output. The combining network is operable to construct and output a composite signal in which a frequency-translated version of one of the first signals is combined with a frequency-translated version of one of the second signals.

In a further embodiment of the invention, a method for constructing a composite signal includes receiving a plurality of signals including at least a first signal and a second signal, and frequency translating the first signal to a first frequency-translated signal, and the second signal to a second frequency-translated signal. The method further includes switchably coupling the first frequency-translated signal to a first output and the second frequency-translated signal to a second output. The output first and second frequency-translated signals are combined to form a composite signal.

These and other features of the invention will be better understood in view of the following description and drawings.

For clarity, previously-identified features retain their reference numbers in subsequent drawings.

DETAILED DESCRIPTION OF EXEMPLARY EMBODIMENTS

Figure 2A:
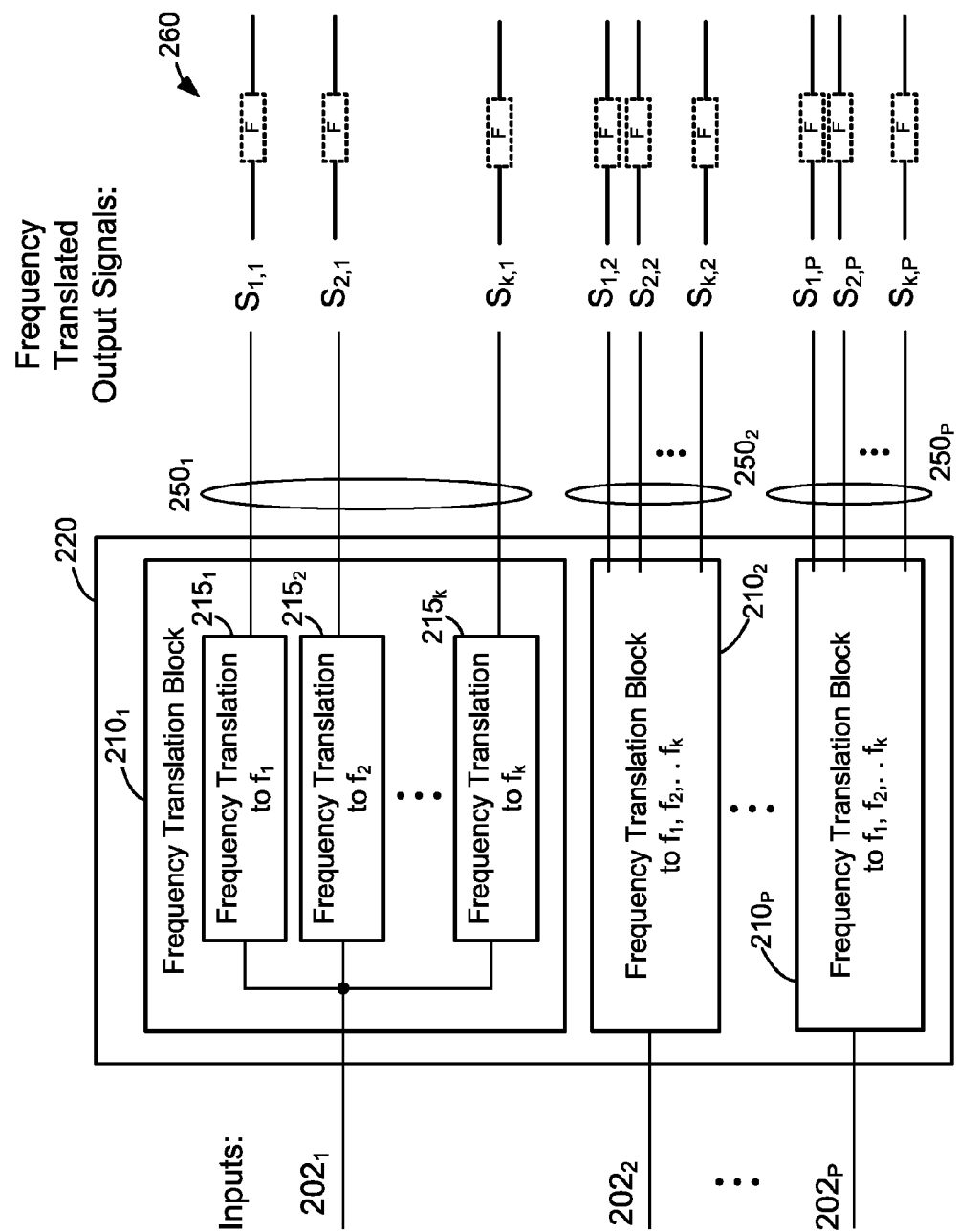
FIG. 2A illustrates a block diagram of a frequency translation circuit in accordance with one embodiment of the present invention.

FIG. 2A illustrates a block diagram of an exemplary frequency translation circuit in accordance with one embodiment of the present invention. This figure, as with all the provided figures, is shown for illustrative purposes only and does not operate to limit the possible embodiments of the present invention or the claims.

As illustrated, the frequency translation circuit 220 includes a plurality of P inputs $202_1$-$202_P$ ("P" numbering any integer, e.g., 1, 2, 3, 4, 5, 6, 8, 10, 12, 14, 16, 20, 100 or more), and a corresponding plurality of P output groups $250_1$-$250_P$. The frequency translation circuit 220 further includes P frequency translation blocks $210_1$-$210_P$, each frequency translation block 210 having an input coupled to receive a respective one of the inputs 202, and "k" outputs ("k" numbering any integer, e.g., 1, 2, 3, 4, 5, 6, 8, 10, 12, 14, 16, 20, 100 or more), whereby each frequency translation block is operable to frequency translate (via translation modules 215) said received input signal to one of a plurality of k different translational frequencies $f_1$-$f_k$. Accordingly, each frequency translation block 210 is configured to output k different frequency translated versions of the supplied input signal, referred to herein as "frequency translated signals" (e.g., $S_{1,1}$-$S_{k,1}$). The supplied k different frequency translated signals are illustrated as a group of output signals (e.g., signals $S_{1,1}$-$S_{k,1}$ belonging to signal group $250_1$).

In a particular embodiment, each translation frequency $f_1$-$f_k$ represents a center frequency of a frequency range or spectrum to which the input signal bandwidth is translated. In a specific embodiment, the input signal bandwidth (BW) is substantially one channel wide, and in a further embodiment, the input bandwidth includes a multiplicity of channels, occupying a larger bandwidth. In a further embodiment, the frequency translation process does not affect the bandwidth of the input signal, and according, the frequency translated signal possesses largely the same bandwidth as its corresponding input signal.

Depending on the respective bandwidths and center frequency separation between adjacently-located, frequency translated signals, their frequency ranges may overlap. For instance, if the spacing between center frequencies is less than the total sum of one-half the bandwidth of each frequency-translated signal, (e.g., the signal BW if both frequency translated signals have substantially the same BW), the ranges will overlap; otherwise they will not. In the present invention, some or all translated frequency ranges are combined with each other to produce a composite signal that is then conveyed to a receiver. In the case of an overlap in the BW of adjacent signals, filtering may be employed to attenuate some or all of the overlapped portion of the spectrum to reduce signal interference in the combined signal.

Accordingly in a specific embodiment of the invention, the term "frequency translated signal" refers to the non-overlapping portion the frequency translated signal, either when (a) no portion of the signal overlaps with an adjacent signal, in which case the entire BW of the frequency translated signal is the signal's effective bandwidth, or (b) adjacent signals partially overlap, in which case the non-overlapped portion of the frequency translated signal is the signal's effective bandwidth. An example of a non-overlap case is when input signal BW is 500 MHz and the translated center frequency spacing is 700 MHz. In general, the entire signal bandwidth containing multiplicity of channels is of interest, but typically only a portion of the signal bandwidth (i.e. the desired range) is needed at a time by each individual receiver. In some cases, only one channel (or relatively small group of channels) is needed by any given receiver at any given time.

Figure 7:
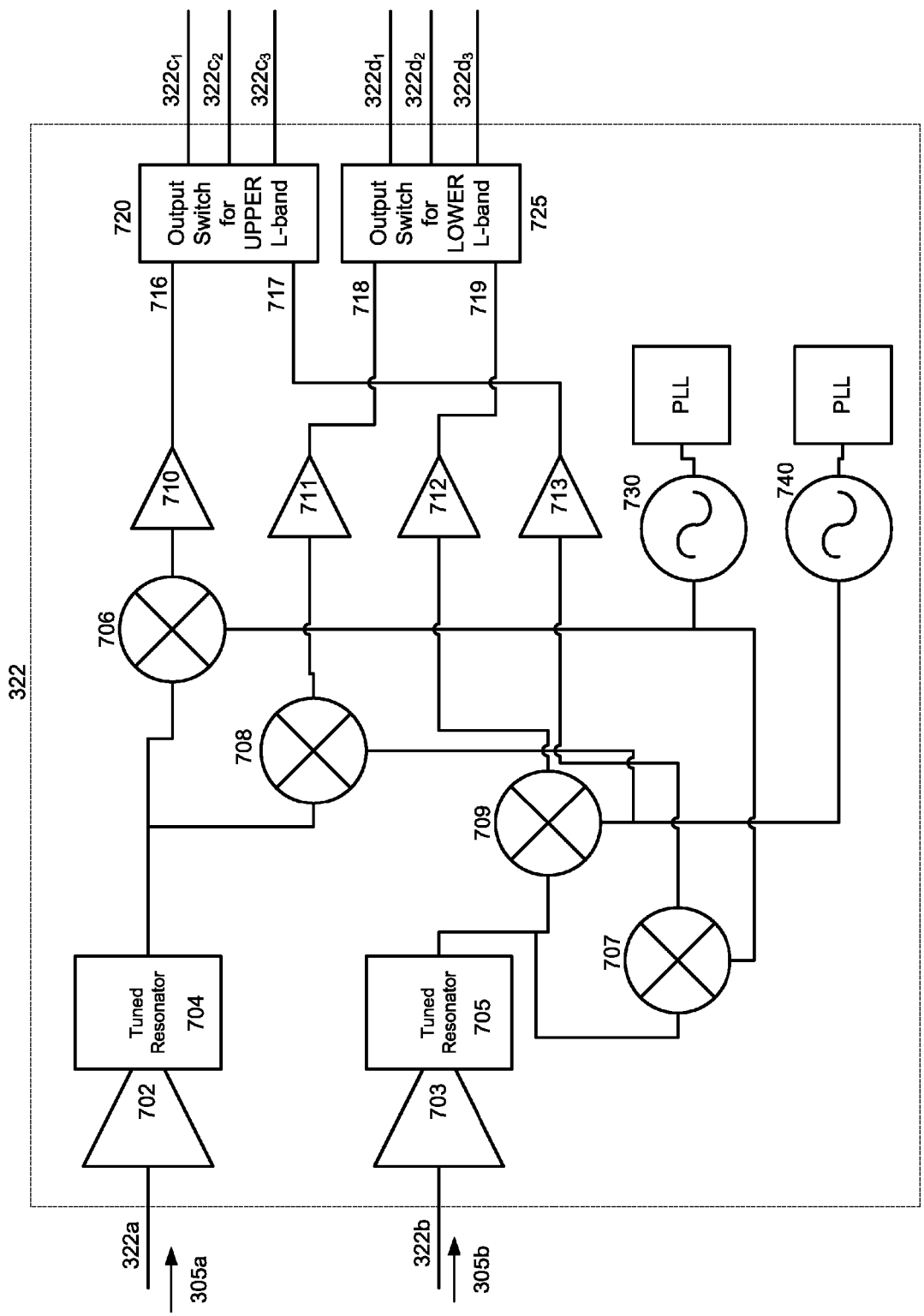
FIG. 7 illustrates a functional block diagram of a translational switch employed in accordance with one embodiment of the present invention.

The translation modules $215_1$-$215_k$ may be realized using a variety of different circuitry and means; e.g., oscillator and mixer circuitry, as described in exemplary embodiment of FIG. 7. In a specific embodiment, translation module $215_1$ includes mixer 706 and local oscillator 730 (fixed or variable output frequency), these components operable to provide a first frequency-translated version of the input signal 705a. Further exemplary, translation module $215_2$ includes mixer 707 and local oscillator 740 (fixed or variable output frequency), these components operable to provide a second frequency-translated version of the input signal 705a.

As shown, each frequency translation circuit 220 is operable to frequency translate a supplied input signal to at least one, and in a further embodiment, a plurality (i.e., 2, 3, 4, 5, 6, 8, 10, 12, 14, 16, 20, 100 or more) of different frequencies, each frequency-translated version of each input signal ("frequency translated signal) output from the frequency translation circuit 220. Further specifically, the frequency translation circuits 220 are operable to provide said frequency translated signals in a satellite television signal distribution system, whereby each input signal (operating, e.g., at Ku or Ka-band) is frequency translated to a plurality of different frequencies (e.g., an upper L-band frequency, and a lower L-band frequency), each of the frequency translated signals being available for later processing. Circuitry, such as a translational switch, and systems employing the frequency-translated signals are described in greater detail herein.

Optionally, one or more filters 260 may be employed to provide needed rejection of noise, interference, or adjacent channel signals. Each of the filters 260 may be of any particular design (e.g., high pass, low pass, bandpass, bandstop, etc.) or construction (microstrip, stripline, coplanar waveguide, suspended substrate, lumped element, etc.) to provide the signal attenuation required. All filters 260 may be of the same design and/or construction, or one, some or all of the filters 260 may differ from each other in their design and/or construction.

The frequency translation circuit 220 may have several different configurations in accordance with the present invention. In one embodiment, the frequency translation circuit 220 includes a frequency translation block (e.g., $210_1$) that is coupled to receive an input signal (e.g., $202_1$) and which is operable to generate a plurality of frequency-translated versions of the input signal at a respective plurality of different frequencies, said plurality of frequency-translated signals (e.g., $S_{1,1}$-$S_{K,1}$) defining a group of frequency translated signals (e.g., $250_1$), wherein the plurality of frequency-translated signals (2, 3, 4, 5, 6, 8, 10, 12, 14, 16, 20, 100 or more frequency-translated signals) are non-overlapping. That is to say each of the signals within the group of frequency translated signals do not overlap each other.

In another embodiment, the frequency translation circuit 220 includes a frequency translation block (e.g., $210_1$) that is coupled to receive an input signal ($202_1$) and which is operable to generate at least three frequency-translated versions of the input signal at a respective at least three different frequencies, said at least three frequency-translated signals (e.g., $S_{1,1}$-$S_{K,1}$) defining a group of frequency translated signals ($250_1$). In this embodiment, 3, 4, 5, 6, 8, 10, 12, 14, 16, 20, 100 or more frequency-translated signals are generated by the frequency translation block.

Figure 2B:
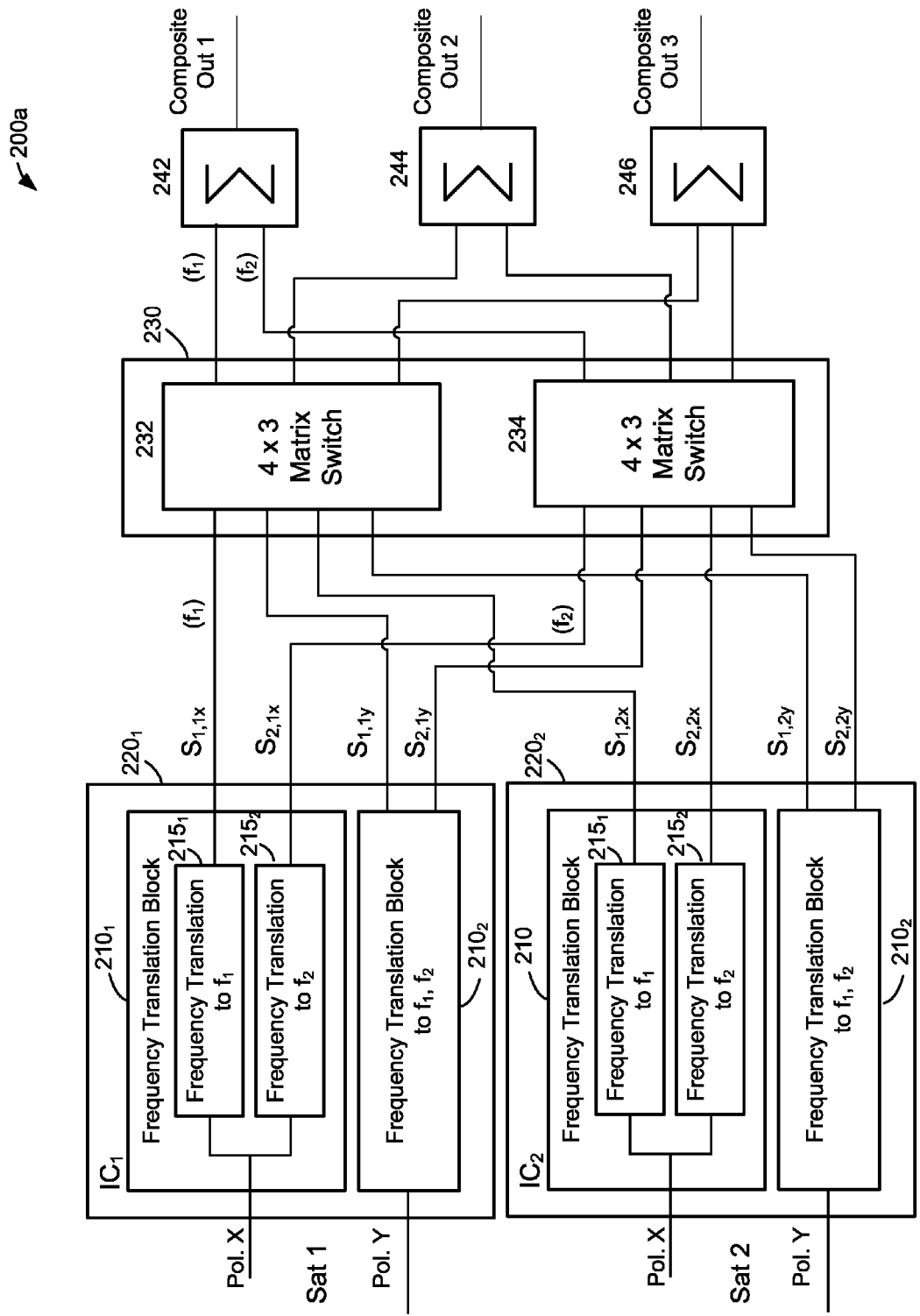
FIG. 2B illustrates a first exemplary system employing the frequency translation circuit of FIG. 2A for constructing a composite signal in accordance with one embodiment of the present invention.

FIG. 2B illustrates a first exemplary system 200a employing the frequency translation circuit of FIG. 2A for constructing a composite signal in accordance with one embodiment of the present invention. In this embodiment, two frequency translation circuits $220_1$ an $220_2$ are implemented, each of the frequency translation circuits $220_1$ and $220_2$ operable to receive two different signals (signals 1X and 1Y representing orthogonal signals X and Y received from a first satellite, and signals 2X and 2Y representing orthogonal signals X and Y received from a second satellite), and each of the frequency translation blocks 210 operable to apply two frequency translations $f_1$ and $f_2$ to the received input signal via translation modules $215_1$ and $215_2$.

The system 200a further includes a switch matrix block 230 in which a first 4×3 switch matrix 232 is operable to couple to each of the first frequency-translated versions of each of the four input signals, and a second 4×3 switch matrix 234 is operable to couple to each of the second frequency-translated versions of each of the four input signals. Each of the first and second switch matrices 232 and 234 are independently operable to switch any of its four inputs to one, some, or all of its 3 outputs. In a particular embodiment of the invention, the frequency translation circuit 220 and switch matrix 230 may be combined to form a translational switch, as will be further described and illustrated below.

The system 200a further includes a combining network in which first, second and third summers 242, 244, and 246 are implemented. Each of the summers 242, 244, and 246 operate to combine a first frequency translated signal (operating at frequency $f_1$) with a second frequency translated signal (operating at frequency $f_2$), and to provide the resultant composite signal to a receiver. Additional receivers could be employed (to enable a larger number of concurrent users) if the output index of each of the switch matrices 232 and 234 and the number of summers are increased. Filters (e.g., high pass, low pass, bandpass, bandstop, etc., as appropriate) may be provided (e.g., coupled between a frequency translation circuit output and a switch matrix input, and/or coupled between a switch matrix output and a summer input, and/or coupled to a summer output) in order to provide needed rejection of noise, interference, or adjacent channel signals. In a particular embodiment, filters 260 may be implemented either at the output of the frequency translation circuit 220, incorporated within each of the summers 242, 244, and 246, or implemented in a combination of these locations.

Figure 2C:
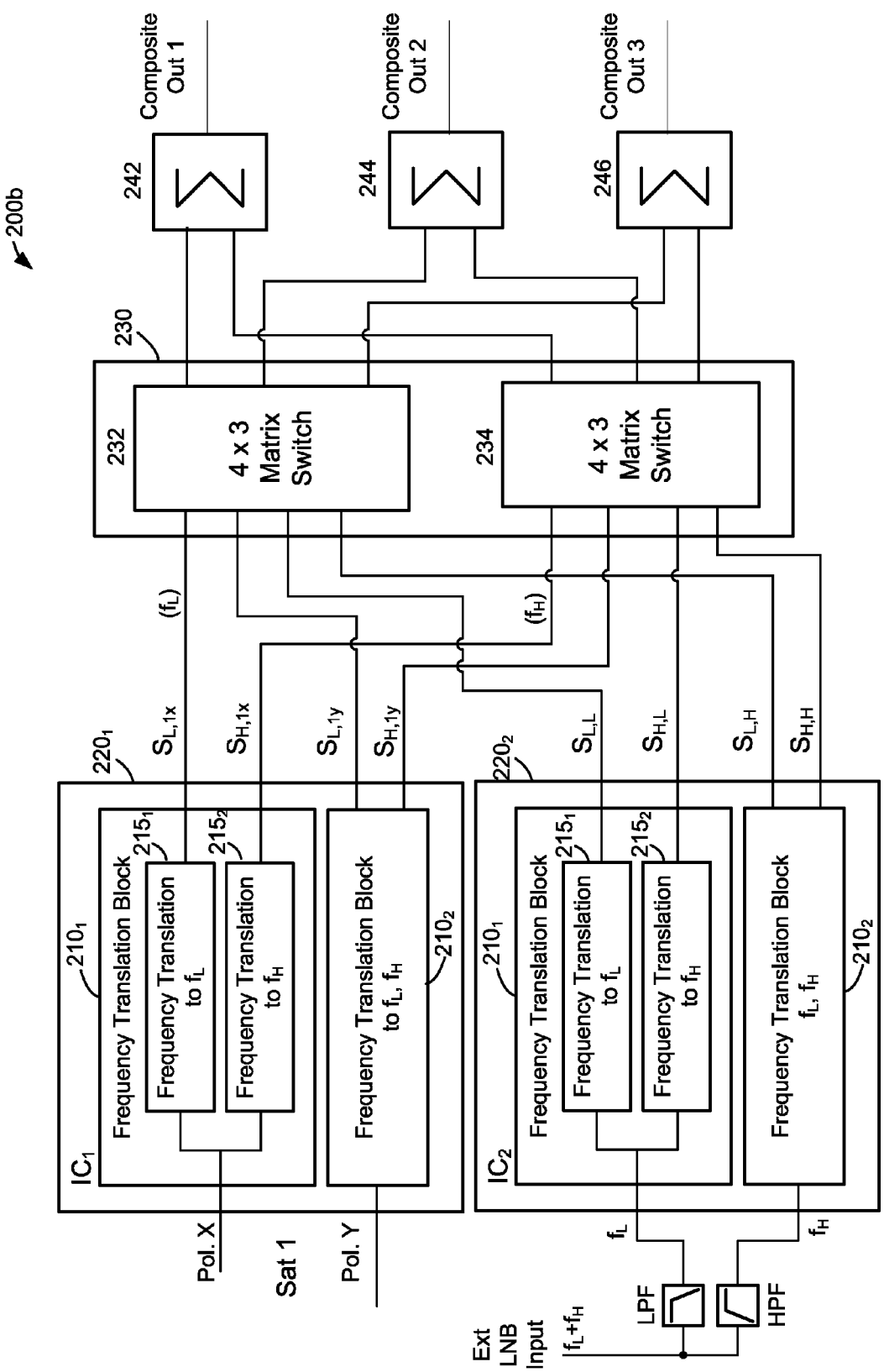
FIG. 2C illustrates a second exemplary system employing the frequency translation circuit of FIG. 2A for constructing a composite signal in accordance with one embodiment of the present invention.

FIG. 2C illustrates a second exemplary system 200b employing the frequency translation circuit of FIG. 2A for constructing a composite signal in accordance with one embodiment of the present invention, with previously-identified features retaining their reference numerals. The system 200b is similar to the system 200a shown in FIG. 2B, with the first frequency translation circuit $220_1$ operable to translate each of the input signals to predefined (e.g., L-band) high and low frequencies ($f_H$ and $f_L$, respectively, which could be alternatively represented as $f_1$ and $f_2$, respectively). The second frequency translation circuit $220_2$ is used to convert an externally-supplied input signal (e.g., an IF signal from a low noise block, LNB) having two signal components ($f_L$ and $f_H$), those signals coinciding substantially in frequency with the high and low translation output frequencies employed by the frequency translation block 210 in the first frequency translation circuit 220. High pass and low pass filters (HPF, LPF) may be used to recover the respective high and low frequency signals from the combined input signal.

The second frequency translation circuit $220_2$ includes a frequency translation circuit $215_1$, whereby the lower frequency component is translated to a signal having substantially the same operating frequency (signal $S_{L,L}$). Such an operation may be performed, for example, my means of a switch or gate switchably operable to couple the input port to the output port. Alternatively, the frequency translation may be performed by mixing the input signal with an LO signal at a frequency which will result in a translated signal at substantially the same frequency. For example, if the input signal is mixed with a high-side LO signal operating at twice the input signal frequency, the resultant mixer product (LO-RF) will be located at the same operating frequency as the input signal, but spectrally inverted. In another embodiment, the LO signal is a DC signal (0 Hz), thereby controlling the mixer to pass the input RF signal therethrough without a substantial change in the frequency and without inversion of the input signal's spectrum.

The second frequency translation circuit $220_2$ further includes a second translation module $215_2$ operable to translate the low frequency input signal to a high frequency signal centered at the high frequency $f_H$ (signal $S_{H,L}$). The second frequency translation circuit $220_2$ includes a second frequency translation block $210_2$ which is similarly operable to the aforementioned frequency translation block $210_1$, providing a high-to-low frequency translation for the high frequency input signal (outputting signal $S_{L,H}$), and a high-to-high frequency translation for the high frequency input signal (outputting signal $S_{H,H}$), wherein the high-to-low and high-to-high frequency translations may be performed using techniques similar to those described for block $210_1$. The low frequency translated signals ($S_{L,L}$ and $S_{L,H}$) are supplied to the first switch matrix 232, and the high frequency translated signals ($S_{H,1}$ and $S_{H,H}$) are supplied to the second switch matrix 234. The switch matrix output signals are provided to summers 242, 244 and 246, each providing a composite signal having both high and low frequency components for each of three receivers (not shown). As above, filters (e.g., high pass, low pass, bandpass, bandstop, etc., as appropriate) may be provided (e.g., coupled between a frequency translation circuit output and a switch matrix input, and/or coupled between a switch matrix output and a summer input, and/or coupled to a summer output) in order to provide needed rejection of noise, interference, or adjacent channel signals. In a particular embodiment, filters 260 may be implemented either at the output of the frequency translation circuit 220, incorporated within each of the summers 242, 244, and 246, or implemented in a combination of these locations.

Figure 2D:
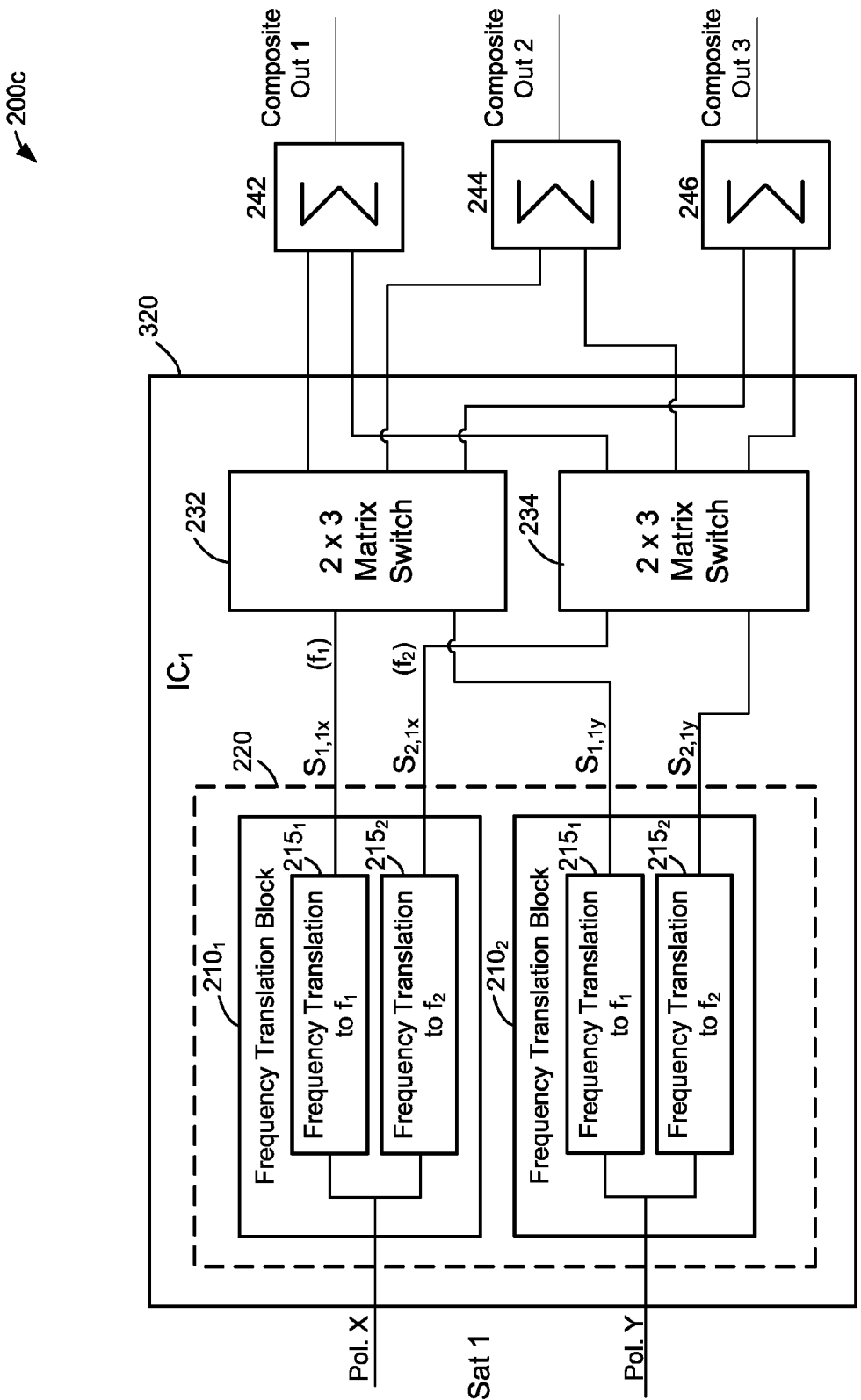
FIG. 2D illustrates a third exemplary system employing the frequency translation circuit of FIG. 2A for constructing a composite signal in accordance with one embodiment of the present invention.

FIG. 2D illustrates a third exemplary system 200c employing a frequency translation circuit of FIG. 2A for constructing a composite signal in accordance with one embodiment of the present invention. In this embodiment, the frequency translation circuit 220 is included with switch matrices 232 and 234 within an integrated circuit, the arrangement of the frequency translated circuit 220 with one or more switch matrices forming the structure of a translational switch 320, as will be further illustrated and described below.

The system 200c is operable to apply two different frequency translations ($f_1$, $f_2$) to each of two received input signals (e.g., two orthogonal signals X and Y received from the same source, such as a satellite), the frequency translation circuit 220 operable to output each of the frequency translated versions of each of the input signals ("frequency translated signals"), a total of four in the illustrated embodiment. In general, the frequency translation circuit 220 will output N×M output signals when N input signals are applied thereto, the frequency translation circuit including a corresponding N frequency translation blocks $210_1$-$210_N$, each frequency translation block 210 providing M different frequency translations.

Switch matrix 232 is operable to receive each of the first frequency-translated versions of each input signal ("first frequency translated signals" $S_{1,*}$), switch matrix 232 operable to provide any of said first frequency translated signals to any one, some, or all of the switch matrix 232 outputs. Switch matrix 234 is operable to receive each of the second frequency-translated versions of each input signal ("second frequency translated signals", $S_{2,*}$), and to output any of said second frequency translated signals to any one, some or all of the switch matrix 234 outputs. Each switch matrix (232 and 234) output is coupled to a respective summer input, each summer 242, 244 and 246 operable to provide a composite signal made up of a first frequency translated signal and a second frequency translated signal.

As above, filters may be employed to provide needed signal rejection, the filters located, for example, on-chip and coupled between a frequency translation output and a switch matrix input, and/or off-chip, coupled between a switch matrix output and a combiner input, or at a combiner output. In a particular embodiment, filters 260 may be implemented either at the output of the frequency translation circuit 220, incorporated within each of the summers 242, 244, and 246, or implemented in a combination of these locations.

In a further refinement of the embodiment shown in FIG. 2D, one or both of the switch matrices 232 and 234 may be operable to provide a null output signal (i.e., no output signal) on one, some or all of its outputs in addition to one of the received frequency translated signals. This feature is further illustrated below. The null output signal may be defined as a signal which does not exceed a predefined signal level. For example, the null output signal may be a signal substantially at ground potential, or it may be defined as a signal having an amplitude which is below that of a predefined detection level (e.g., a signal level more than 10 dB below the level of a predefined reference level known to correspond to a received valid signal). Further exemplary, the null output signal may have a predefined level around (i.e., above or below) the signal ground (e.g., a predefined dc offset), or the null output signal may consist of a zero differential signal. The foregoing serves only as a few examples known to the skilled person, although other representations of a null output signal can also be used as well.

Figure 2E:
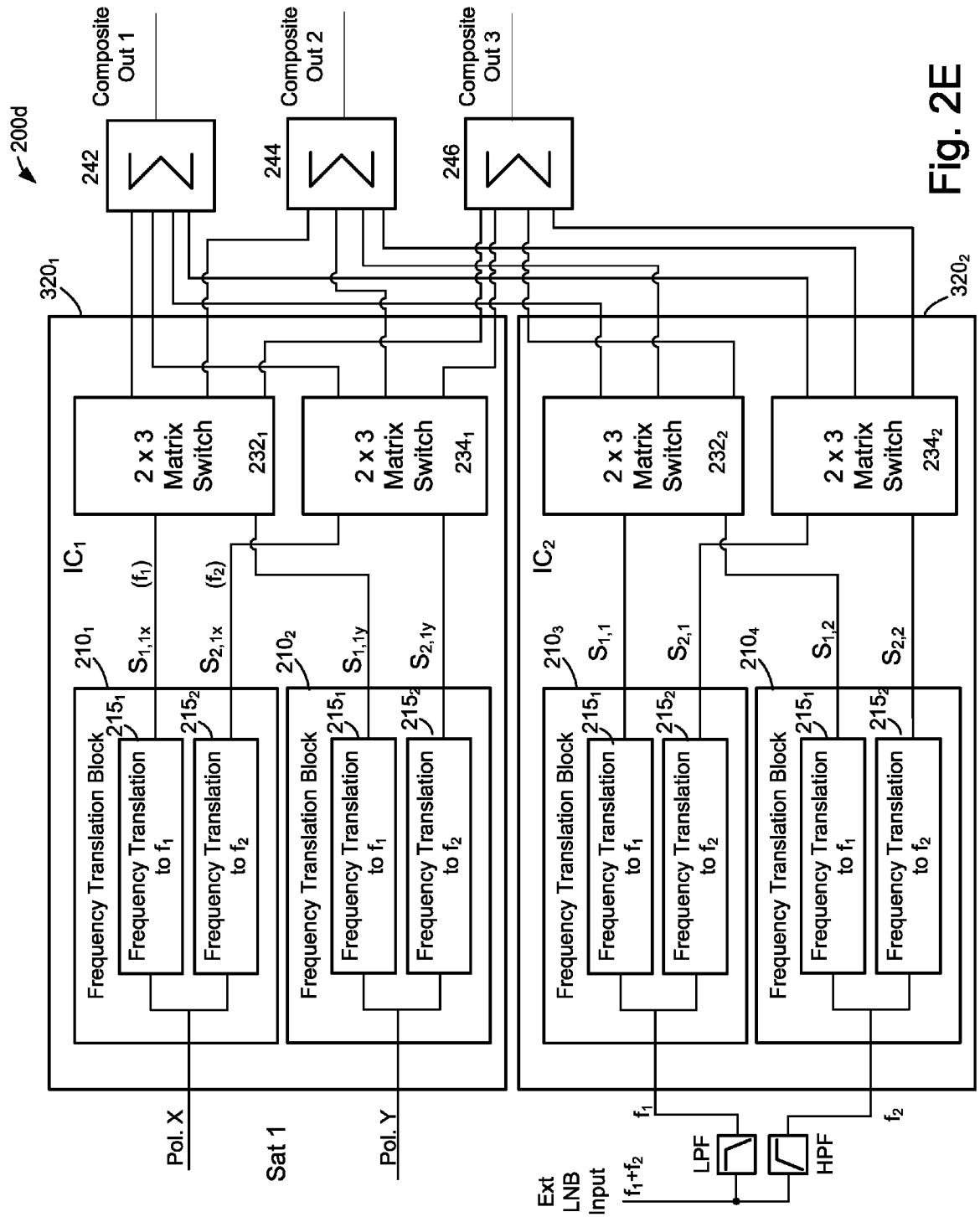
FIG. 2E illustrates a fourth exemplary system employing the frequency translation circuit of FIG. 2A for constructing a composite signal in accordance with one embodiment of the present invention.

FIG. 2E illustrates a fourth exemplary system 200*d* employing a frequency translation circuit of FIG. 2A for constructing a composite signal in accordance with one embodiment of the present invention. The system 200*d* includes two ICs 320$_1$ and 320$_2$, each IC receiving two signals (orthogonal signals in one embodiment) from separate signals source. This architecture provides advantages in that cross-source signal coupling may be reduced as separate ICs are employed to process signals from separate signal sources.

As can be seen, the system 200*d* is similar to the system 200*c* shown in FIG. 2C, with one difference being that four (4) 2×3 switch matrices 232$_1$, 234$_1$, 232$_2$ and 234$_2$ are employed in the system 200*d* of FIG. 2E instead of two (2) 4×3 switch matrices in the system 200*d* of FIG. 2C. Further distinguishing, each IC 320 integrates two (2) 2×3 switch matrices with a frequency translation circuit, thereby forming a translational switch structure 320. Implementation of this structure is further described and illustrated below.

As noted previously, filters may be employed to provide needed signal rejection, the filters located, for example, on-chip and coupled between a frequency translation output and a switch matrix input, and/or off-chip, coupled between a switch matrix output and a combiner input, or at a combiner output. In a particular embodiment, filters 260 may be implemented either at the output of the frequency translation circuit 220, incorporated within each of the summers 242, 244, and 246, or implemented in a combination of these locations.

In a further refinement, one, some or all of the switch matrices 232$_1$, 234$_1$ 232$_2$, and 234$_4$ may be operable to provide a null output signal (i.e., no output signal) on one, some or all of its outputs in addition to one of the received frequency translated signals. This feature is further illustrated below.

Figure 3A:
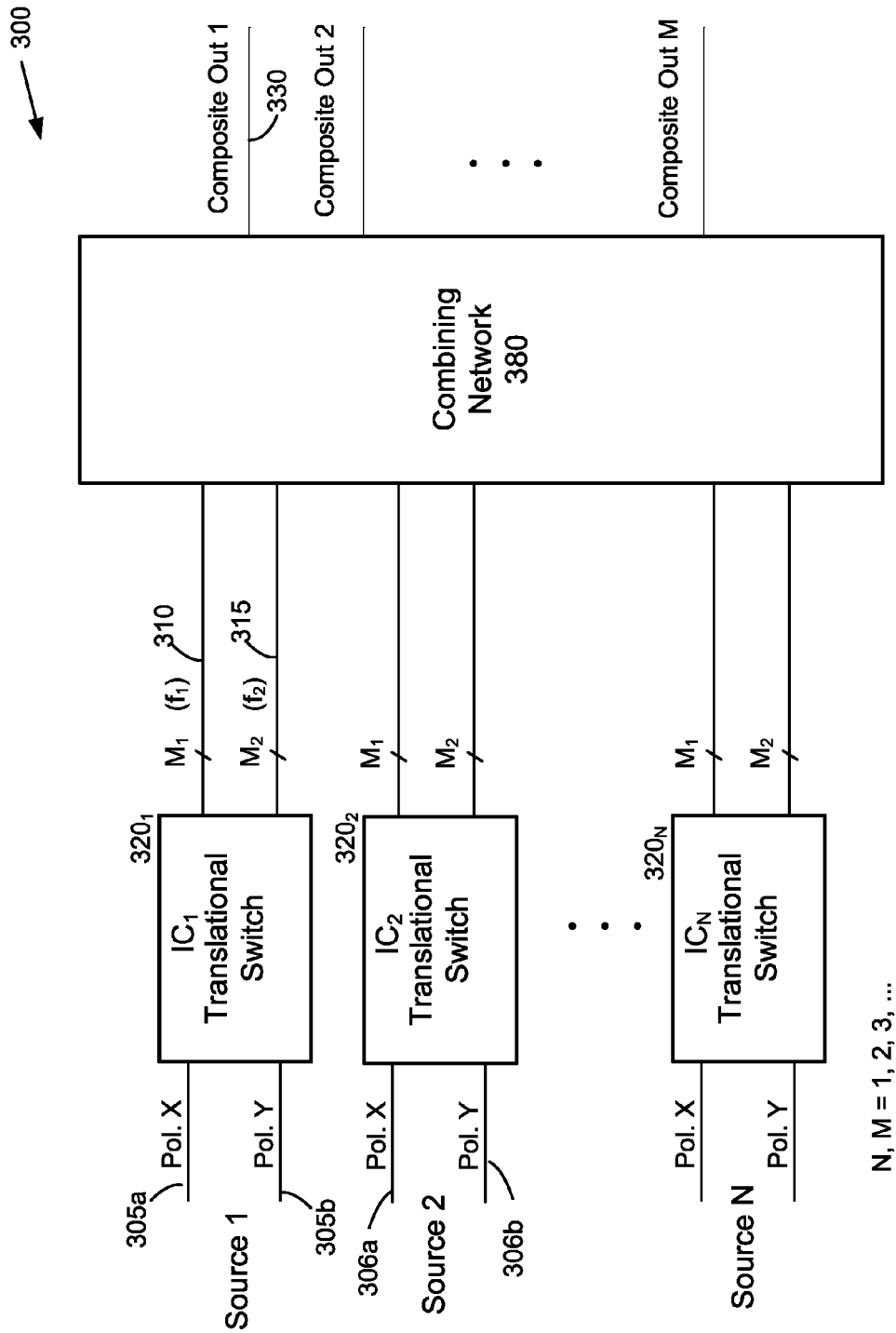
FIG. 3A illustrates an exemplary system employing translational switches for constructing a composite signal in accordance with one embodiment the present invention.

FIG. 3A illustrates an exemplary system 300 employing translational switches for constructing a composite signal in accordance with one embodiment the present invention. The system 300 includes N translational switches 320$_1$-320$_N$ (2 shown, although 1, 3, 4, 5, 6, 8, 10, 12, 14, 16, 20, 100 or more may be employed in alternative embodiments), each translational switch 120 operable to receive a plurality of signals 305*a*, 305*b* (2 shown, although 1, 3, 4, 5, 6, 8, 10, 12, 14, 16, 20, 100 or more may be employed in alternative embodiments) from a respective independent signal source Source$_1$-Source$_N$. Each translational switch 320 further includes a plurality of output groups M$_1$ and M$_2$ (2 groups providing signals 310 and 315 at frequencies f$_1$ and f$_2$, respectively, shown, although 3, 4, 5, 6, 8, 10, 12, 14, 16, 20, 100 or more output groups may be alternatively employed) onto which the translational switch 320 is operable to switchably couple a frequency-translated version of any one of the input signals 305*a*, 305*b*. In particular, each translational switch 320 is operable to frequency translate any of the supplied input signals 305*a*, 305*b* to one of a plurality different translational frequencies, the translational switch further operable to switchably output said frequency translated signal to one, some or all of the outputs in output groups M$_1$ or M$_2$ In the illustrated embodiment shown, each translational switch 320 is operable to translate the input signals 305*a*, 305*b* to one of two different frequency translations F1 and F2, each frequency translated signal switchably output to one, some, or all of the outputs included within a respective one of the output groups M$_1$ or M$_2$. In an alternative embodiment, any one or more of the translational switches 320 may be operable to frequency translate the input signals 305*a*, 305*b* to any one of 3, 4, 5, 6, 8, 10, 12, 14, 16, 20, 100 or more different translation frequencies, said translational switch(es) having a corresponding 3, 4, 5, 6, 8, 10, 12, 14, 16, 20, 100 or more different output groups M, each output group M having a plurality of outputs, whereby the frequency-translated version of the input signals 305*a*, 305*b* is switchable coupled onto one, some or all of the outputs within a respective one of the output groups M$_1$ or M$_2$.

The system 300 further includes a combining network 380, the combining network 380 having a plurality of inputs, and a plurality of outputs, each combining network input coupled to a respective one of the translational switch outputs. The combining network 380 is operable to construct a composite signal, in which two or more of the frequency translated signals are combined. Exemplary embodiments of the combining network are presented below.

In one exemplary embodiment described herein, the independent sources Source$_1$-Source$_N$ are satellite signal sources, and the plurality of input signals 305*a*, 305*b* are two orthogonal signals originating from one satellite source. Further exemplary, each translational switch 320 is operable with two translational frequencies (e.g., an upper L-band frequency of 1650-2150 MHz, and a lower L-band frequency of 950-1450 MHz), each translational switch including two groups of outputs M$_1$ and M$_2$ for providing frequency translated signals 310 and 315 at translation frequencies f$_1$ and f$_2$, respectively. Combining network 380 is operable to combine two of any of the frequency translated signals output from the translational switches 320 to provide a composite signal of the desired signal components. In a particular embodiment, each of the composite outputs carry any combination of frequency translated versions of any input signal, assigning, for example, the signal content (i.e., one or more channels) of an input signal of satellite source X to a lower L-band range (e.g., 950-1450 MHz) and the signal content (one or more channels) of an input signal of satellite source G to an upper L-band range (1650-2150 MHz). The source of each band in the composite signal is independently selected from any input signal (e.g., polarization X or Y) of any satellite 1 through N. Furthermore, each composite output signal 1 through M can feed independently operating tuners/receivers (not shown), each tuner/receiver operable to receive any of the satellite signals independently from the other tuner/receiver.

Figure 3B:
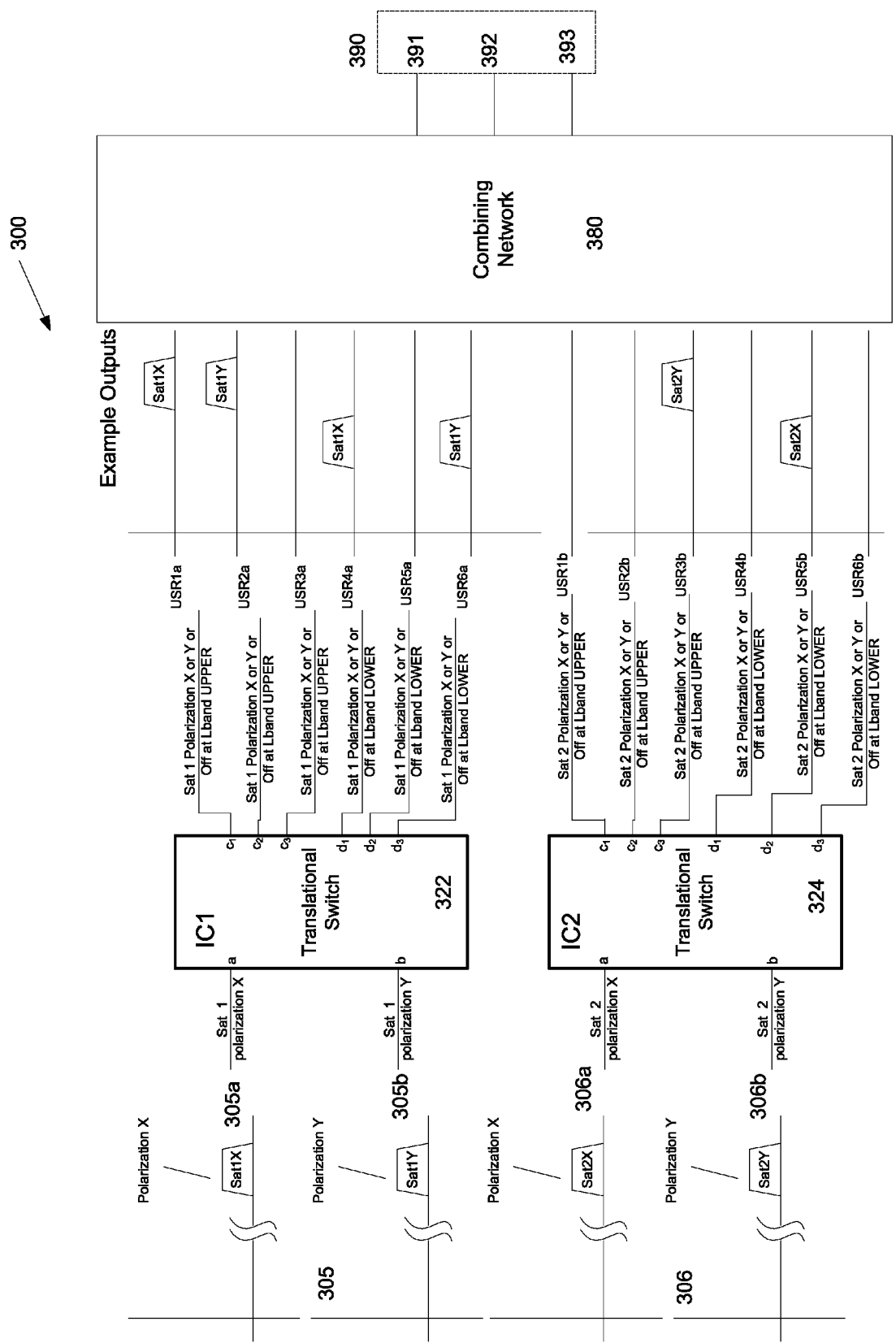
FIG. 3B illustrates an exemplary system of FIG. 3A operable to construct a composite signal in accordance with one embodiment the present invention.

FIG. 3B illustrates a further detailed embodiment of the system 300 shown in FIG. 3A in accordance with the present invention. The exemplary system 300 includes translational switches 322 and 324 and a combining network 380. The system 300 is operable to assemble multiple signals to form a composite signal, the signals to be assembled into the composite signal being in the form of one or more individual channels, one or more bands of channels (each band including, e.g., a group of two, three, four, five, ten or more channels), or a combination of both channels and bands. Once constructed, the composite signal is supplied to one or more receivers 390, either via a wired connection (e.g., coaxial or fiber cable) or wireless connection (e.g. RF, infrared, optical link, etc.).

In the illustrated exemplary embodiment, the plurality of translational switches 120 includes first and second translational switches 322 and 324, although three or more translational switches may be used in alternative embodiments of the invention. Each of the first and second translational switches 322 and 324 includes a plurality of inputs and first and second plurality of outputs. In the illustrated embodiment, the first translational switch 322 includes inputs 322*a* and 322*b*, and outputs $322c_1$-$c_3$ and $322d_1$-$d_3$, and the second translational switch 324 includes inputs 324a and 324b and outputs $324c_1$-$c_3$ and $324d_1$-$d_3$. Each of the translational switch inputs is coupled to receive a respective signal, e.g., the inputs 322a and 322b of the first translational switch 322 coupled to receive one of signals 305a and 305b, respectively, and the inputs 324a and 324b of the second translational switch 324 coupled to receive one of signals 306a and 306b, respectively. Further exemplary, signals 305a and 305b are substantially uncorrelated, e.g., obtained from circularly or linearly orthogonal signals. Similarly, signals 306a and 306b are also substantially uncorrelated. Further exemplary, signals 305 and 306 originate from different sources, each or both of which may be satellite or terrestrial sources, in analog or digital format, and operate at any particular frequency or data rate. In a specific exemplary embodiment, signals 305 and 306 are Ku or Ka-band satellite signals originating from different satellites.

The first and second translational switches 322 and 324 are each operable as a frequency translating switch matrix to switchably output either a frequency-translated version of its respective received signal(s) 305 or 306, or no output signal (referred to as a null output, described above). In the exemplary embodiment shown, the first translational switch 322 is operable to output, on any (one, some, or all) of its first plurality of output ports $322c_1$-$322c_3$, either a first frequency-translated version of any one of the first signals 305a or 305b, or no output signal (referred to as a null output signal). Further exemplary, the first translational switch 322 is operable to output, on any of its second plurality of output ports $322d_1$-$322d_3$, either a second frequency-translated version of any one of the first signals 305a or 305b, or a null output signal. As an example, an upper band mixing product (corresponding to an upper band 1650 MHz-2150 MHz of a downconverted L-band signal) may represent the first frequency-translated version of one of the input signals 305a or 305b, and a lower band mixing product (corresponding to a lower band 950 MHz-1450 MHz of a downconverted L-band signal) may represent the second frequency-translated version of said signal (or visa versa). The first and second frequency-translated versions of the input signal may be distinguished based upon differences in their respective frequencies, phases, amplitudes, as well as other signal characteristics. As further shown, the first translational switch 322 is operable to frequency translate both input signals 305a and 305b (input signal pair 305) as described above, on a per-source basis.

In the illustrated exemplary embodiment, the second translational switch 324 is similarly configured, and is operable to output on any (one, some or all) of its first plurality of output ports $324c_1$-$324c_3$, either a first frequency-translated version of any one of the second signals 306a or 306b, or no output signal, as well as to output on any of its second plurality of output ports $324d_1$-$324d_3$, either a second frequency-translated version of any one of the second signals 306a or 306b, or a null output signal. The second translational switch 324 is shown as being operable to frequency translate both input signals 306a and 306b (input signal pair 306) as described above, on a per-source basis.

The frequency translation/conversion the translational switches 322 and 324 perform may be any type of frequency translation, e.g. up conversion or down conversion. In a particular embodiment, each of the translational switches 322 and 324 operates as a downconverter in which the first frequency translation is an upper band down conversion of one of the received signals, and the second frequency translation is a lower band downconversion of one of the received signals. The translational switches 322 and 324 are not limited to performing only two possible frequency translations, and under an alternative embodiment, one, some, or all may be operable to provide a translation to at least a third frequency, thereby providing an output at one of at least three different frequencies or a null output in accordance with the invention.

As shown in FIG. 3B, the first translation switch 322 is configured to output signal components USR1a-USR6a, and second translational switch 324 is configured to output signal components USR1b-USR6b. As examples, USR1a is a down-converted/upper band version of input signal 305a, USR2a is a down-converted/upper band version of input signal 305b, and USR3a and USR5a are null outputs from the first translational switch 322. USR4a is a down-converted/lower band version of input signal 305a, and USR6a is a down-converted/lower band version of input signal 305b. Outputs from the second translation switch 324 include USR1b, USR2b, USR4b and USR6b, which are illustrated as null outputs in the exemplary embodiment. USR3b is a down-converted/upper band version of input signal 306b, and USR5b is a down-converted/upper band version of input signal 306a. The foregoing outputs are only exemplary, and different outputs (or null outputs) can be supplied to any or all of the outputs in order to provide the desired composite signal. A circuit block diagram of an exemplary translational switch is further presented in FIG. 7 below.

The combining network 380 includes inputs coupled to a respective one of the first translational switch outputs ($324c_1$-$324c_3$, $324d_1$-$d_3$), and to a respective one of the second translational switch outputs ($324c_1$-$324c_3$, $324d_1$-$d_3$). The combining network 380 is operable to construct a composite signal in which a frequency-translated version of one of the first signals 305a, 305b is combined with a frequency-translated version of one of the second signals 306a, 306b. An exemplary embodiment of the combining network 380 is illustrated below in FIG. 2.

Receivers 391, 392, 393 may be any type of device operable to receive at least a portion of the supplied composite signal. In one embodiment, the receiver is an agile tuner, such as a tunable set top box, operable to tune over substantially all of the composite signal's spectrum. In another embodiment, the receiver is limited as to its tuning range (or may have a fixed tuning range), in which case the present invention facilitates placement of the desired signal within the receiver's tuning range.

Figure 1:
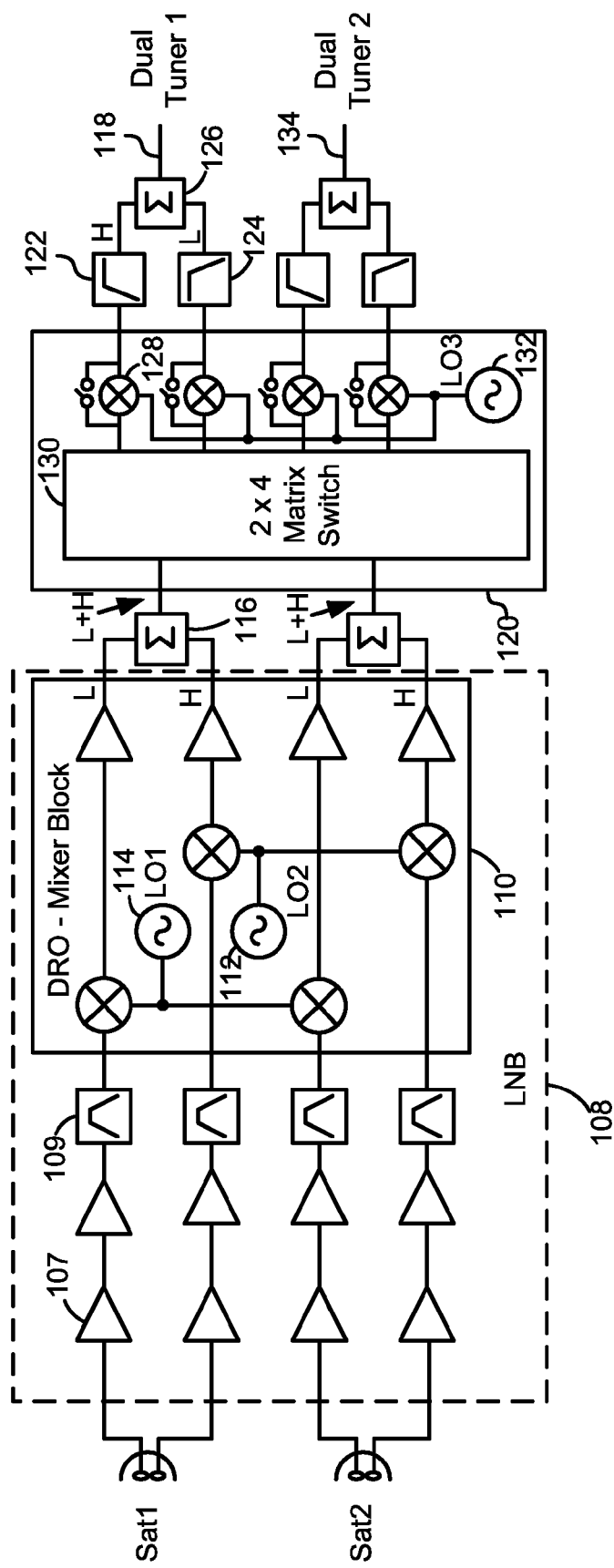
FIG. 1 illustrates a conventional satellite television distribution system operable to construct and distribute a composite output signal.

Advantageously, the system 300 is configured such that separate translation switches 322 and 324 are provided for separate signal sources. In the exemplary embodiment shown in FIG. 1, the first and second translational switches 322 and 324 are implemented as separate integrated circuits, each operable to receive signals from its respective source only. Allocating one signal source per translational switch improves signal isolation between sources, and lower noise in the resultant composite signal.

In a specific embodiment in which the translational switch operates as a down-converter, the translational switch is configured to perform frequency translation/downconversion of the received signals prior to the switching operation. This arrangement allows the design of the switching circuitry to be simplified, as the switching circuit will operate at a lower frequency compared to the frequency of the received signals 305 and 306.

Further advantageously, the system 300 operates to construct a composite signal for use by a receiver 190 by implementing a single (one) frequency translation. In the above-illustrated exemplary embodiment, each of the translational switches 322, 324 operated to perform a single frequency translation (i.e., a single downconversion) from Ku-band input signals 305a, 305b, 306a, 306b to L-band signal components USRXa and USRXb for assembly into a L-band composite signal, as will be further illustrated below. A single frequency translation system provides significant benefits in reduced cost and complexity, as well as lower signal distortion and noise, in comparison with multi-conversion systems.

The system may be employed in a variety of applications, one of which is to construct a composite signal from a variety of satellite signal sources. In such an example, each of the translational switches 320 (of which there may be two, three, four, five or more) are operable as to each receive two orthogonally-polarized signals, each signal set from a separate satellite to increase satellite-to-satellite isolation. Further particularly, each translational switch 320 operates as a downconverting switch matrix, for example, downconverting Ku-band input signals to L-band IF signals at the translational switch outputs. Further particularly, each translational switch is operable to frequency translate each input signal to either one of two different frequencies, an upper or lower band downconverted frequency.

Figure 4:
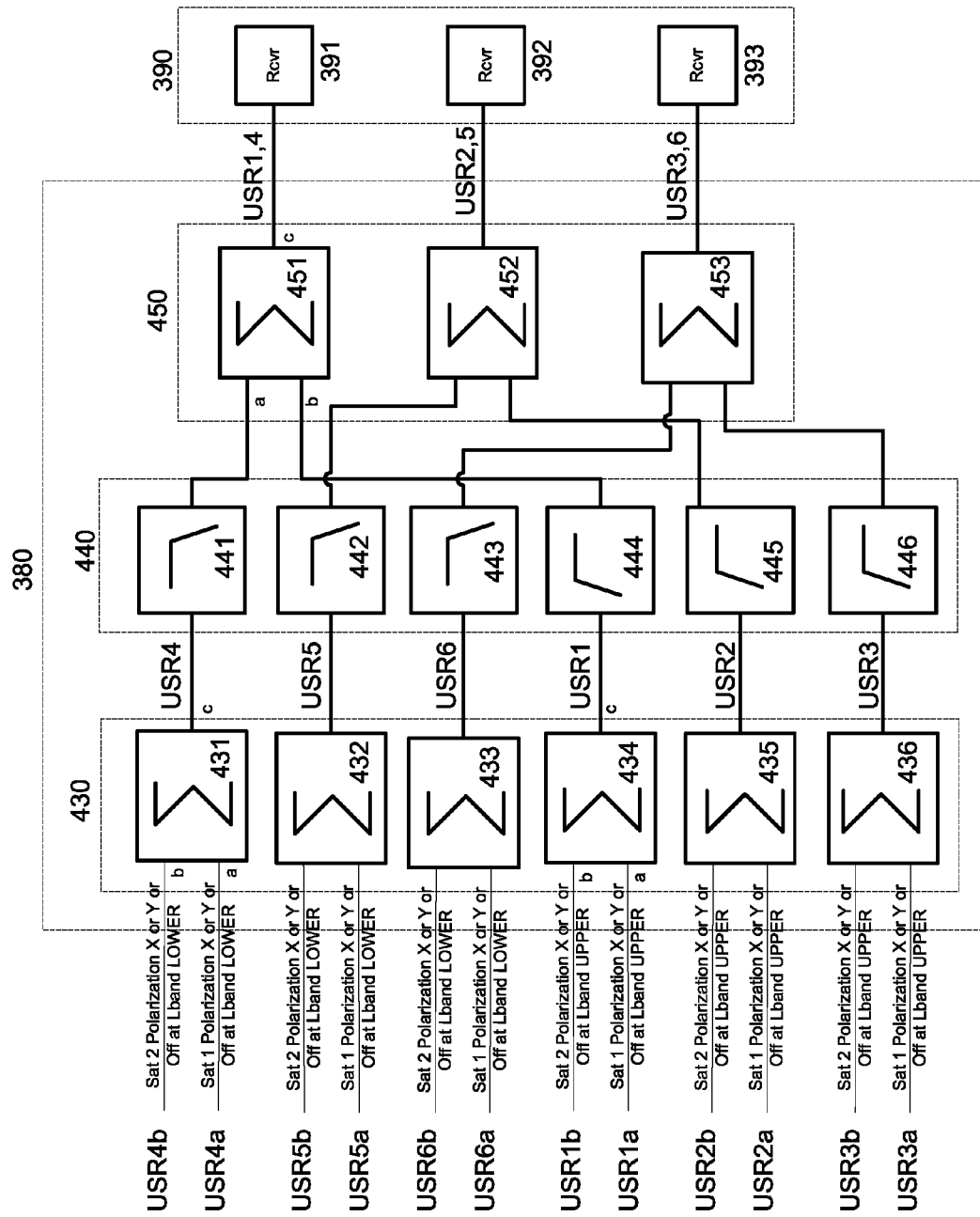
FIG. 4 illustrates an exemplary embodiment of a combining network employed in accordance with the present invention.

FIG. 4 illustrates an exemplary embodiment of the combining network 380 in accordance with the present invention. In the illustrated embodiment, the combining network includes first stage summers 430, optional filters 440, and second stage summers 450.

The first stage summers 430 are provided to construct portions of the composite signal spectrum at either the first or second translation frequency. Summers 431, 432 and 433 are operable to construct the lower band portion of the composite signal (referred to as summed second frequency-translated signals), and summers 434, 435, and 436 are operable to construct the upper band portion of the composite signal (referred to as summed first frequency-translated signals).

In particular, first stage summer 431 includes a first input 431a coupled to $322d_1$ of the first translational switch 322, a second input 431b coupled to $324d_1$ of the second translational switch 324, and an output 431c, the first stage summer 431 operable to combine output signals USR4a and USR4b into a combined lower band signal of USR4. First stage summers 432 and 433 are similarly configured, with summer 432 being operable to combine output signals USR5a and USR5b into a combined lower band signal of USR5, and summer 433 operable to combine output signals USR6a and USR6b into a combined lower band signal of USR6.

First stage summers 434, 435 and 436 are similarly configured to construct the composite signal portion at the second translation frequency, which in one exemplary embodiment is the downconverted/upper band version of the received signal. Summer 434 includes a first inputs 434a coupled to $322c_1$ of the first translational switch 322, a second input 434b coupled to $324c_1$ of the second translational switch 324, and an output 434c, the first stage summer 431 operable to combine output signals USR1a and USR1b into a combined upper band signal of USR1. Summers 435 and 436 are similarly configured, with summer 434 being operable to combine output signals USR2a and USR2b into a combined upper band signal of USR2, and summer 436 being operable to combine output signals USR3a and USR3b into a combined upper band signal of USR3.

It will be appreciated that different levels of integration may be applied to the first stage summers. For instance, the top three (3) two-port summers may be integrated to form a six input, three output summer, in which each of the inputs are coupled to receive one of the lower band down-converted versions of the first or second input signals 305 or 306, and the bottom three (3) two-port summers are similarly integrated to a second, six input, three output summer in which each of the inputs are coupled to receive one of the upper band down-converted versions of the first or second input signals 305 or 306. The summers 430 may be realized in a variety of different circuit structures, for example, a switched structure, a current or voltage summing circuit, a Wilkinson-type combiner structure, or any other combining structure.

While the exemplary system embodiment of FIG. 3B illustrates two translational switches employed, it will be appreciated that the system could be expanded to include additional translational switches, each switch, optionally, coupled to receive orthogonal signals from a separate signal source (e.g., satellites positioned in different orbital slots). As an example, the illustrated system may be expanded to include three translational switches, in which case each of the first stage summers 431-436 would include an additional input to receive a signal USRX"c" from the third translational switch. Those skilled in the art will appreciate that other modifications to the exemplary system may be made as well in accordance with the present invention.

The combining network 380 further includes one or more second stage summers 450, shown in the exemplary embodiment as including three summers 451, 452 and 453. Second stage summers 451, 452, and 453 are used to combine the upper and lower band portions into the desired composite signals.

As illustrated, summer 451 includes a first input 451a coupled to the first summer output 431c, a second input 451b coupled to the fourth summer output 434c, and an output 451c for coupling to receiver 391. As exemplified, summer 451 is operable to combine the lower band component USR4 with the upper band component USR1 to form a combined composite signal USR1,4. Summers 452 and 453 are similarly configured, with summer 452 being operable to combine the lower band component USR5 with the upper band component USR2 to form a combined composite signal USR2,5, and summer 453 being operable to combine the lower band component USR6 with the upper band component USR3 to form a combined composite signal USR3,6. The assembled composite signals USR1,4, USR2,5, and USR3,6 are supplied to their respective receivers 391, 392, and 393, via wired or wireless means.

Three second stage summers 451, 452, and 453 are shown, although a larger or smaller number may be implemented in alternative embodiments. For example, if only a single composite signal USR2,5 is sought, summers 451 and 453 may be omitted. Alternatively, if a new composite signal USR1,5 is sought, a new summer may be employed having a first input coupled to the second summer output 432c, a second input coupled to the fifth summer output 435c, and an output coupled to the receiver operable to tune to such a composite signal spectrum. This new summer may be provided either alternatively to one of the three second stage summers 451, 452, or 453, or in addition thereto.

The skilled person will appreciate that the second stage summers 450 may be employed with varying degrees of integration. For example, the number of three (3) two-port summers may be integrated to form one six input, three output summer in which each of the inputs are coupled to one of the first stage summer outputs, and each output is coupled to a respective receiver. The second stage summers 450 may be constructed in a manner similar to that of the first stage summers 430. Further optionally, the combining network 380 may be monolithically formed in an integrated circuit. The combining network may be realized (in whole or portions thereof) as a differential signal topology or as a single-ended circuit.

Optionally, filters 440 may be employed to provide additional signal rejection when needed. In the exemplary embodiment of FIG. 2, lowpass filters 441, 442 and 443 are operable to provide additional signal rejection outside of a predefined low passband for the lower band downconverted signal components USR4-USR6, and highpass filters 444, 445 and 446 are operable to provide additional signal rejection outside of a predefined high passband for the upper band downconverted components USR1-USR3. It will be appreciated that not all signal components may require additional filtering, in which case a filter may be omitted; or that two or more filters may be cascaded to provide additional attenuation or a particular filter response. Each of the filters may be realized in a variety of designs, such as Butterworth, Chebychev, elliptical, structures and the like. Furthermore, other types of filters, such as bandpass or bandstop filters may be used alternatively or in addition to the lowpass and highpass filters illustrated.

Figure 5:
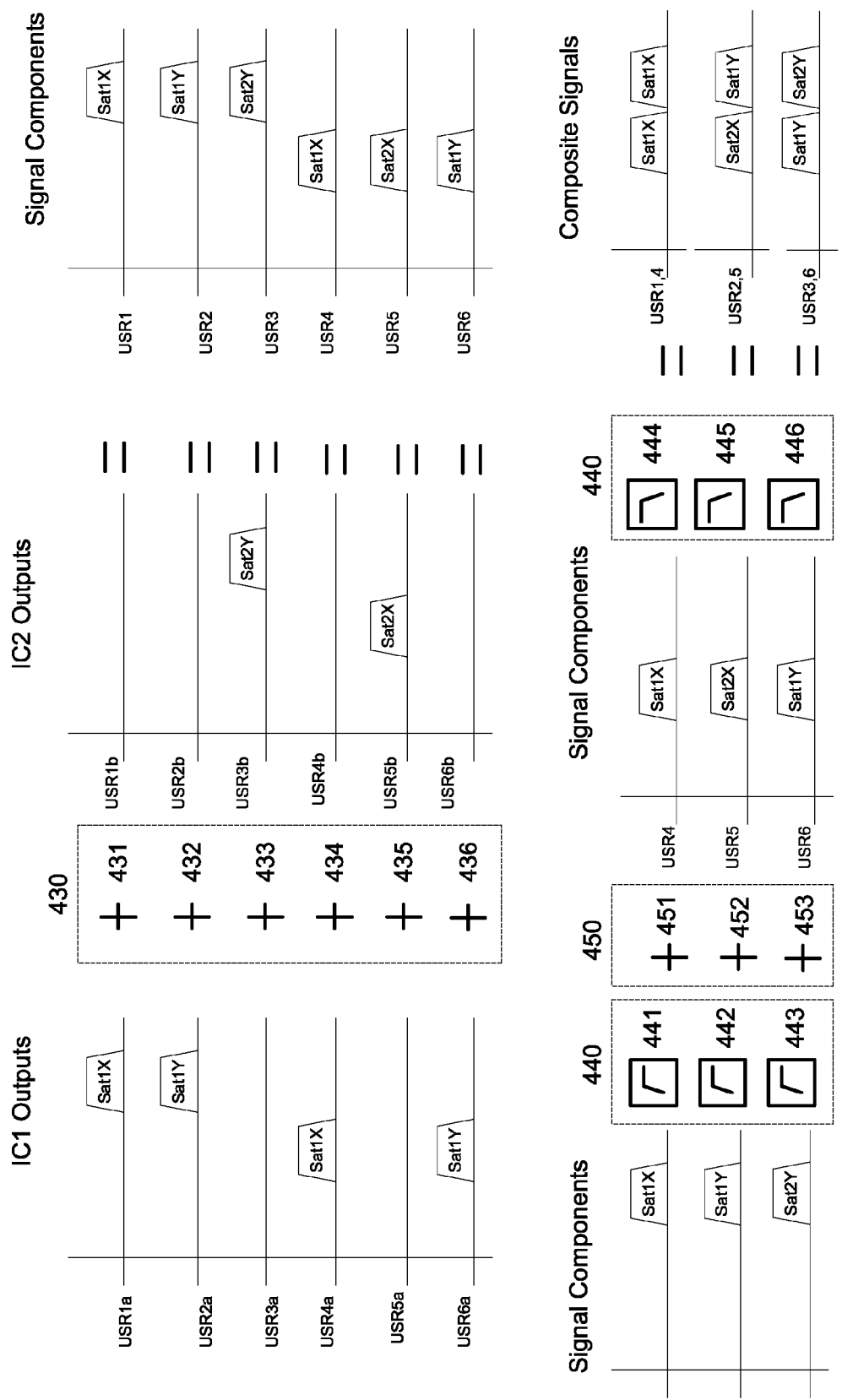
FIG. 5 illustrates signal components present at different nodes of the system described in FIGS. 3A and 3B in accordance with the present invention.

FIG. 5 illustrates signal components present at different nodes of the system 300 as described in FIGS. 3B and 4 in accordance with the present invention. Signal components USR1$a$ and USR1$b$, output from the first and second translational switches 322 and 324, respectively, are combined using first stage summer 431 to produce signal component USR1, representing the combined spectrum of the downconverted/upper band (i.e., first frequency-translated) version of the received signals. In a similar manner, signal components USR4$a$ and USR4$b$, also output from the first and second translational switches 322 and 324, respectively are combined using first stage summer 434 to produce signal component USR4 representing a combined spectrum of the downconverted lower band (i.e., second frequency-translated) version of the received signals.

Signal component USR1 is highpass filtered via filter 441, and signal component USR4 is lowpass filtered via filter 444. Signal components USR1 and USR4 are subsequently summed, using second stage summer 451, to form the composite signal USR1,4 as shown. In a similar manner, composite signals USR2,5 and USR3,6 are constructed.

Figure 6:
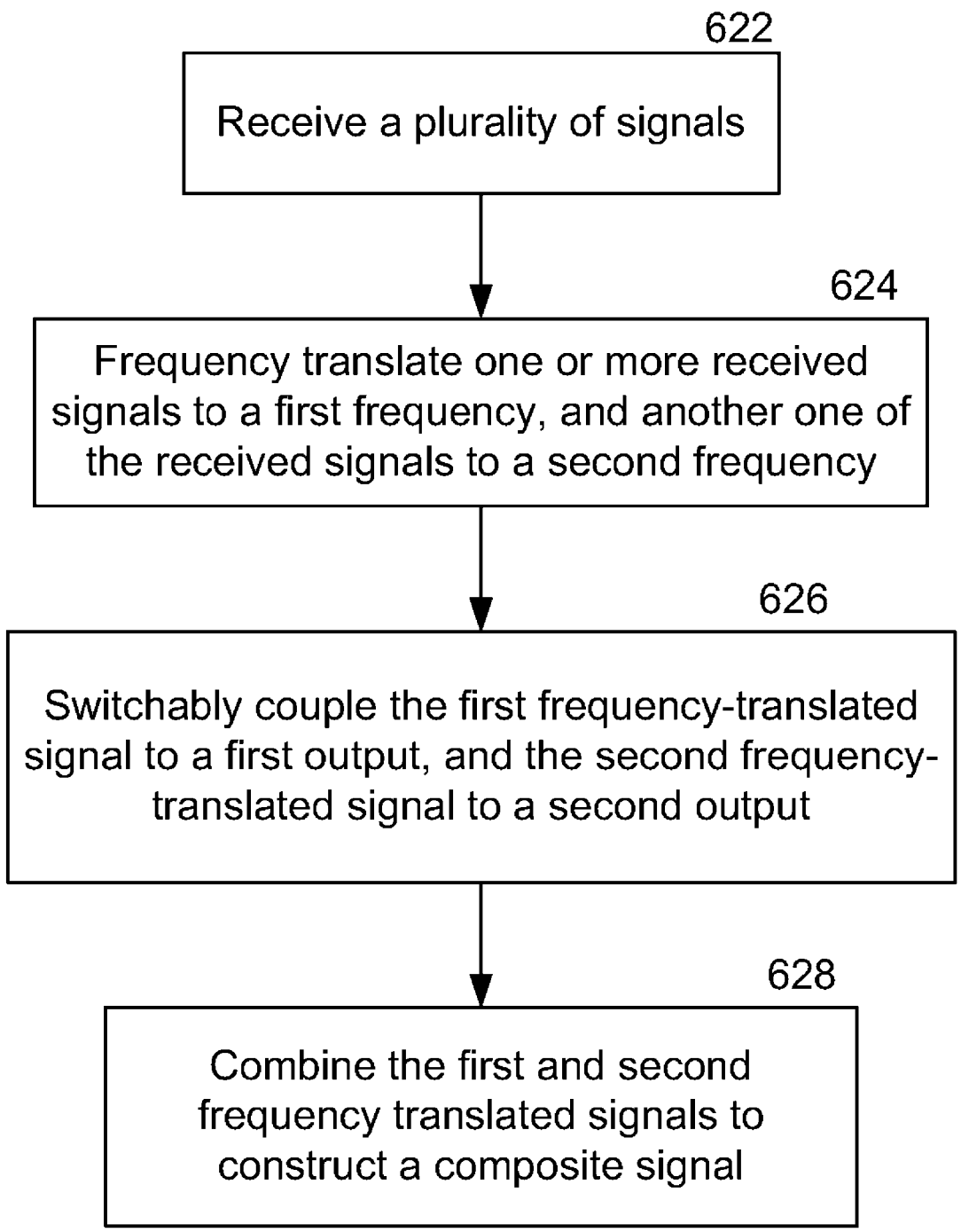
FIG. 6 illustrates a method of constructing a composite signal in accordance with one embodiment of the present invention.

FIG. 6 illustrates a method of constructing a composite signal in accordance with one embodiment of the present invention. At 622, a plurality of signals (e.g., 305$a$, 305$b$, 306$a$, 306$b$) are received, and at 624, at least one of the received signals (e.g., 305$b$) is frequency translated to a first frequency (e.g., USR2$a$), and at least another one of the received signals (e.g., 306$a$) is translated to a second frequency (e.g., USR5$b$). At 626, the first frequency-translated signal (e.g., USR2$a$) is switchably coupled to a first output (322$c_2$), and the second frequency-translated signal (USR5$b$) is coupled to a second output (324$d_2$). At 628, the first and second frequency-translated signals are combined to form a composite signal (e.g., USR2,5).

Operation 622, in a particular embodiment, includes receiving a first plurality of signals (e.g., 305$a$, 305$b$) and a second plurality of signals (e.g., 306$a$, 306$b$), each of the first and second plurality of received signals including a plurality of substantially orthogonal signals (e.g., 305$a$, 305$b$ and 306$a$, 306$b$). As noted above, the received signals may comprise satellite or terrestrial originated signals operating at any particular frequency or data rate.

Operation 624, in a particular embodiment, includes downconverting at least one of the received signals to a first frequency (e.g., a lower band), and downconverting at least another of the plurality of signals to a second frequency (e.g., an upper band). In alternative embodiments, operation 624 may include upcoming at least one of the received signals to a first frequency, and/or upconverting at least one of the received signals to a second frequency.

Operation 626, in an exemplary embodiment, includes performing a switching operation in which one or more output signals are selectively output, the output signals comprising either: (i) a first frequency-translated version of a received signal, (ii) a second frequency-translated version of its respective received signals being in the form of a lower band down-converted mixing product, or (iii) a null output signal. Operations 624 and 626 may be collectively performed by a translational switch 322 shown in FIG. 3B in accordance with one embodiment of the present invention. In a further specific embodiment, operation 624 is performed prior to operation 626, whereby frequency translation of the received signal precedes switchably outputting either a frequency translated version of the received signal or a null output to a selected one or more outputs.

Operation 628, in a particular embodiment, includes a first stage summing process in which each of the first frequency components of the received signals are summed together, and each of the second frequency components of the received signal are summed together. The exemplary embodiment of operation 626 further includes a second stage summing process in which one of the summed first frequency components is combined with one of the summed second frequency components to construct a composite signal spectrum. Further optionally, the method of FIG. 6 includes a process of filtering at least one of the first and second frequency-translated versions of the received signal. This process, when optionally employed may be implemented using one or more of the filters 440 shown in FIG. 4.

FIG. 7 illustrates a functional block diagram of translational switch 322 in accordance with one embodiment of the present invention. In a specific embodiment of the invention, translational switches 322 and 324 are identically constructed, although this is not necessary in all instances, and translational switches 322 and 324 may differ as to the number of inputs, number of outputs, or both. It will be appreciated that power and control signals are supplied to each of the illustrated component, although these features are not shown to facilitate illustration.

The translational switch 322 includes a first input 322$a$ for receiving signal 305$a$, second input 322$b$ for receiving signal 305$b$ (signals 305$a$ and 305$b$ being orthogonal signals transmitted from a common source, such as a satellite, in an exemplary embodiment), output ports 322$c_1$-322$c_3$ for providing a first frequency translated version of the received signals 305$a$ and/or 305$b$ or a null output, and output ports 322$d_1$-322$d_3$ for providing a second frequency translated version of the received signals 305$a$ and/or 305$b$ or a null output.

Internally within the translational switch 322, received signals 305$a$ and 305$b$ are processed in parallel. Signal 305$a$ is supplied to an amplifier (e.g., a low noise amplifier) 702 and tuned resonator 704. The resultant signal is subsequently supplied to each of two mixers 706 and 708 for providing the first and second frequency translated versions of the received signal 305$a$, respectively. Mixers 706 and 708 are supplied with different LO frequencies by means of a respective two LO sources 730 and 740, respective PLL-controlled oscillators in a particular embodiment. Alternatively, the PLL-controlled oscillators 730 and 740 may be dielectric resonator oscillators. One or both of the oscillators 730 and 740 be a fixed frequency or variable frequency type.

Mixers 706 and 708 may perform any particular frequency translation, and in a particular embodiment perform a down-conversion of the received signal to respective first and second IF frequencies. In an alternative embodiment, mixers 706 and 708 each perform upconversion process in which the respective first and second output frequencies are higher in frequency than the supplied input signal 305a.

A first frequency-translated version (e.g., an upper band) of the received signal 305a (signal 716) is output from mixer 706, and a second frequency-translated version of the received signal 305a (signal 718) is output from mixer 708. Amplifiers 710 and 712 may be used to provide amplification and buffering to each of the signals 716 and 718.

Along a parallel path, received signal 305b is similarly processed by means of an input amplifier 703, tuned resonator 705, and two mixers 707 and 709, thus resulting in a first frequency-translated version of the second received signal 305b output from mixer 707 (signal 717), and a second frequency-translated version of the second received signal 305b output from mixer 709 (signal 719). Amplifiers 711 and 713 may be employed to provide amplification and buffering to each of the signals 717 and 719.

As shown, the first frequency-translated versions of received signal 305a (signal 716) and received signal 305b (signal 717) are each supplied to a first output switch 720, and the second frequency-translated versions of received signal 305a (signal 718) and received signal 305b (signal 719) are each supplied to a second output switch 725. The first switch 720 operates to apply either: (i) signal 716, (ii) signal 717, or (iii) a null output signal on any one, some or all of the outputs $322c_1$-$322c_3$. In a similar manner, the second switch 720 operates to apply either: (i) signal 718, (ii) signal 719, or (iii) a null output signal on any one, some or all of the outputs $322d_1$-$322d_3$. In this manner, the translational switch 322 is operable to output on any one or more of the output ports $322c_1$-$322c_3$, either (i) any of the first frequency-translated (e.g., upper band) versions of the received signals 305a and 305, or (ii) a null output signal, and on any one or more of the output ports $322d_1$-$322d_3$, either: (i) any of the second frequency-translated (e.g., lower band) versions of the received signals 305a and 305b, or (ii) a null output signal.

In a particular embodiment, received signals 305a and 305b are orthogonal Ku-band signals, mixers 706-709 are operable as downconverters for downconverting the received signals into L-band signals 716, 717, 718 and 719, and the first and second output switches 720 and 725 are L-band 2×3 switches. Further exemplary, the illustrated circuit (either in its entirety or in part) may be realized in either a differential signal construction or a single-ended signal construction. Alternative embodiments may be practiced in accordance with the invention. For example, the mixers 706-709 may be made operable as up-converting mixers, and the first and second switches 720 and 725 may be made operable at other frequencies. In addition, oscillators/PLL 730 and 740 can be implemented in or outside the IC and can be shared with other frequency translation devices in the system. Furthermore, the circuit may be fabricated as a monolithic integrated circuit in any particular base substrate material, a few examples being Si, SiGe, or GaAs.

Figure 8A:
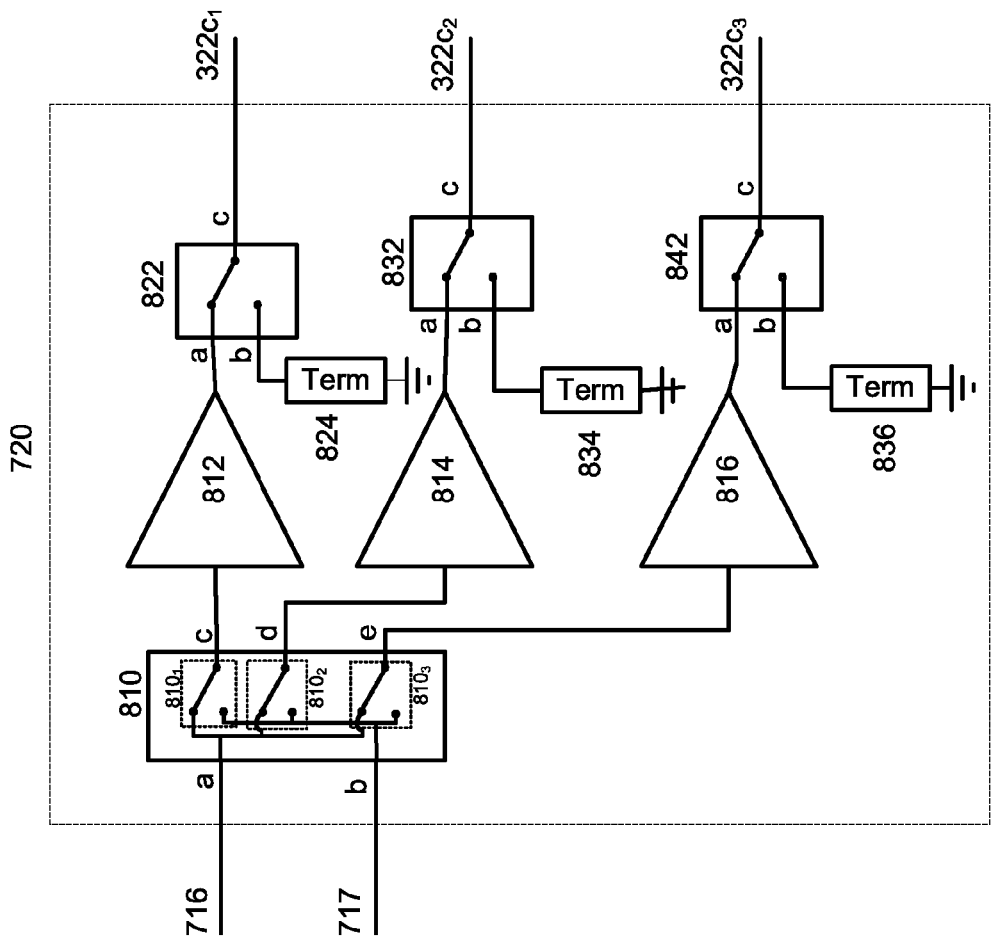
FIG. 8A illustrates a first exemplary embodiment of an output switch employed in accordance with one embodiment of the present invention.

FIG. 8A illustrates a first exemplary embodiment of the output switch 720 in accordance with one embodiment of the present invention. In a specific embodiment of the invention, output switches 720 and 725 are identically constructed, although their construction may differ in alternative embodiments under the invention.

In the exemplary embodiment illustrated, the output switch 720 includes a first switch 810, one or more optional amplifiers 812, 814, and 816, a plurality of second switches 822, 832, and 842, and a respective plurality of terminations 824, 834, and 844. Power and control signals are supplied to each of the illustrated component, although these features are not shown to facilitate illustration.

The first switch 810 includes a first input 810a coupled to receive the first frequency-translated version of received signal 305a (signal 716) and a second input 810b coupled to receive the first frequency-translated version of the received signal 305b (signal 717). The first switch 810 further includes outputs 810c, 810d and 810e, each coupled to an input of respective switches 822, 832, and 842. The first switch 810 is operable to couple any of signals 716 and 717 to any one or more of the outputs 810c, 810d, and 810e. For example, the first switch 810 is made operable to provide signal 716 to each of the outputs 810c, 810d, and 810e when a control signal (not shown) of a first type is supplied thereto, and operable to provide signal 717 to each of the outputs 716c, 716d, and 716e when the control signal is of a second type. Optionally, one or more buffer amplifiers 812, 814, and 816 are employed to provide signal gain and buffering between the first switch 810 and each of the second switches 822, 832, and 842.

In the exemplary embodiment shown, the first switch 810 is constructed from three (3) two-pole, single-throw (2P1T) switches $810_1$, $810_2$, and $810_3$, each operable to switch between either signal 716 or 717. In a particular embodiment, control of the three 2P1T switches $810_1$, $810_2$ and $810_3$ (via control signal(s), not shown) are synchronized such that all of the switches $810_1$, $810_2$ and $810_3$ are switched to couple to either signal 716, or signal 717. In this manner, the outputs 810c, 810d and 810e output either signals 716 or signals 717.

Second switch 822 includes a first input 822a, a second input 822b, and an output 822c, with second switches 832 and 642 being similarly configured. The second switch 822 is operable to selectively switch (responsive to a control signal, not shown) its input pole to either the first input 822a to receive an output signal from the first switch 810, or to the second input 822b to couple to a load 624. When couple to the first input 822a, the second switch 822 provides the signal supplied to the first input 822a (either signal 716 or signal 717, depending upon the state of switch 810) to its output 822c. When coupled to the second input 822b, the second switch 822 provides a null output signal to its output 822c, as well as presenting the impedance of termination 824 to the input of the next stage component (e.g., a first stage summer input 434a). The impedance of termination 842 may be chosen as any value (e.g., a short circuit, an open circuit, a 50 ohm load, or any impedance value, as well as a capacitive or inductive load, and realized in either lumped element or distributed form), and in one embodiment is selected so as to provide an optimal impedance match to the subsequent component to minimizing the generation of transients which could interfere with/degrade signals supplied on the other outputs 810d and/or 810e. Second switches 832 and 842 are similarly implemented, each operable to provide signals 716 or 717, or a null signal at their respective outputs.

While the first switch 810 operates as a 2P3T switch and each of the second switches 822, 832, and 842 are implemented as 2P1T switches, other switch types may be implemented to route a larger or smaller number of signals. Furthermore, all or portions of the output switch 720 may be constructed in either differential signal or single-ended form, and monolithically fabricated with corresponding output switch 725, or at a higher level of integration, e.g., as a part of the translational switch 320 IC.

Figure 8B:
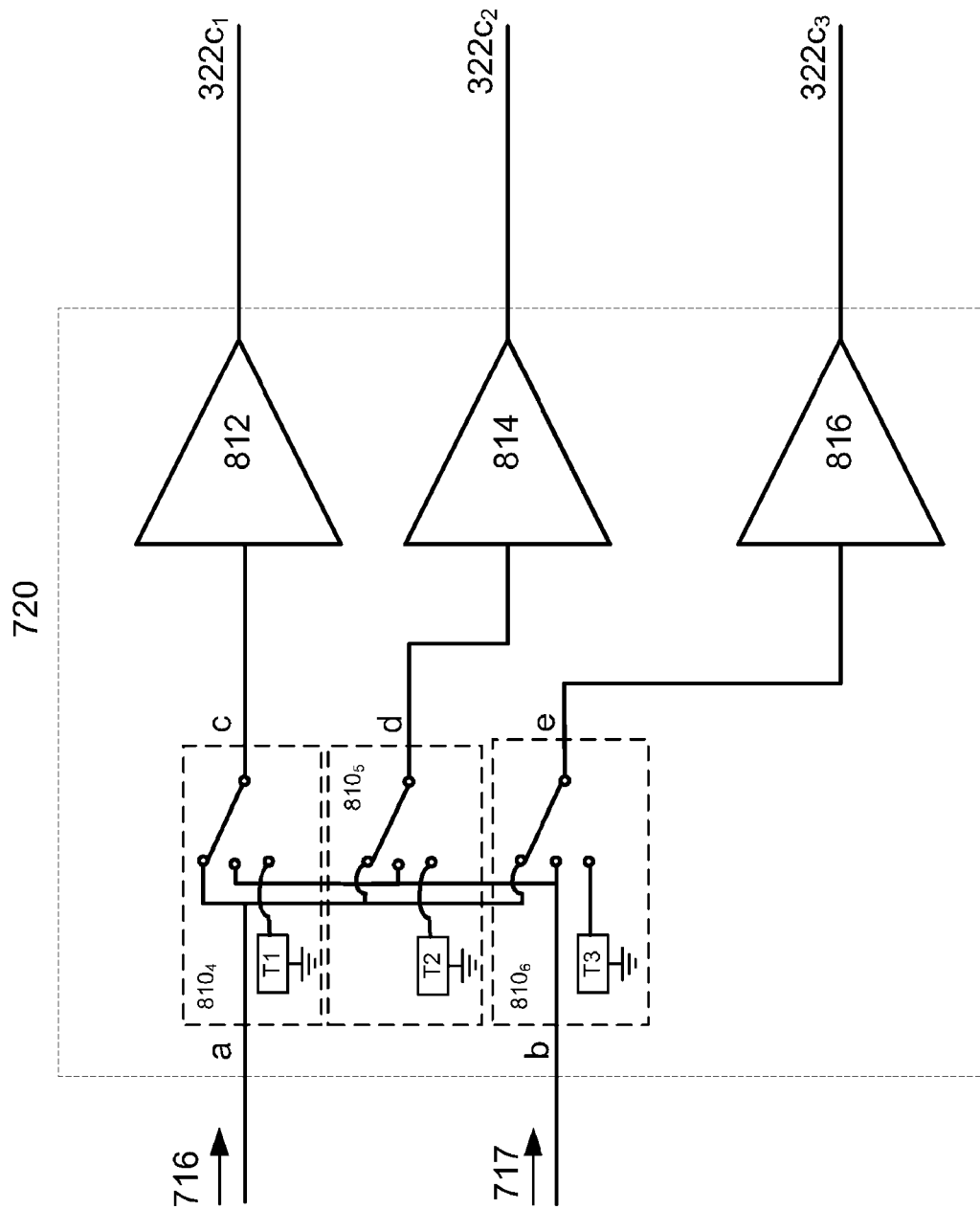
FIG. 8B illustrates a second exemplary embodiment of an output switch employed in accordance with one embodiment of the present invention.

FIG. 8B illustrates a second exemplary embodiment of the output switch 720 in accordance with one embodiment of the present invention. As noted above, output switches 720 and 725 may be identically constructed, although in other embodiments, their construction may differ.

In the exemplary embodiment of FIG. 8B, the first switch 810 includes three (3) triple-pole single-throw (3P1T) switches $810_4$, $810_5$ and $810_6$, each operable to switch between three connections, signal 716, signal 717, or a respective termination T1, T2, or T3. Each of the terminations T1, T2, or T3 may be of any value (short circuit, 50 ohms, open circuit, capacitive or inductive load) and in a particular embodiment is selected to provide an impedance which provides an optimal match to the switch. Terminations T1, T2, and T3 are shown as individual components, although a common termination may be alternatively employed and coupled to each of the switches $810_4$, $810_5$ and $810_6$. For example, depending on the type of the amplifiers and source impedances driving lines 716 and 717, the three terminations could be collapsed into one common termination coupled to each of the third poles of switches $810_4$, $810_5$, and $810_6$.

In a particular embodiment, control of the three 3P1T switches $810_4$, $810_5$ and $810_6$ (via control signal(s), not shown) are synchronized such that the each of the switches $810_4$, $810_5$ and $810_6$ couple to either (i) signal 716 exclusively, or (ii) signal 717 exclusively, or (iii) a combination of signal 716 and their respective terminations T1, T2 and/or T3, or (iv) a combination of signal 717 and their respective terminations T1, T2 and/or T3. For example, switch $810_4$ may be controlled to couple to the termination connection (e.g., when this connection is desired to be muted to provide a null output signal) and switch $810_5$ and $810_6$ is switched to signal 716. Any one or more of the switches $810_4$, $810_5$ and $810_6$ may be coupled to either its respective termination (when that switch output is desired as a null output signal) or signal 716. Similarly, switches $810_4$, $810_5$ and $810_6$ may be controlled to couple to either their respective terminations or to signal 717, with none, one, some or all of the switch connections coupled to either their respective terminations, or to the signal 717. Effectively, the switches $810_4$, $810_5$ and $810_6$ are controlled such that any combination of signals may be output except a combination in which signals 716 and 717 are simultaneously output from switch 810. In the exemplary embodiment, switch 810 is controlled to output either signal 716, or 717, but not both signals simultaneously, with none, some or all of the switch outputs 810c, 810d, and 810e possibly being null output signals.

The exemplary output switch 720 further includes one or more buffer amplifiers 812, 814, and 816 operable to provide signal gain and buffering between the first switch 810 and outputs $322c_1$-$322c_3$. In comparison with the exemplary embodiment of FIG. 8A, second switches 822, 832, and 842 along with terminations 824, 834 and 844 are omitted as unnecessary. Implementation of the 3P1T switches $810_4$, $810_5$, and $810_6$ and the termination connection 611 within the first switch 810 obviates the need for the second switches 822, 832, and 842 and terminations 824, 834, and 844.

As readily appreciated by those skilled in the art, the described processes may be implemented in hardware, software, firmware or a combination of these implementations as appropriate. In addition, some or all of the described processes may be implemented as computer readable instruction code resident on a computer readable medium, the instruction code operable to program a computer of other such programmable device to carry out the intended functions. The computer readable medium on which the instruction code resides may take various forms, for example, a removable disk, volatile or non-volatile memory, etc., or a carrier signal which has been impressed with a modulating signal, the modulating signal corresponding to instructions for carrying out the described operations.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serve to refer to one exemplary embodiment of a claimed feature, and the claimed feature is not limited to the particular embodiment referred to by the reference indicia. The scope of the claimed feature shall be that defined by the claim wording as if the reference indicia are absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A translational switch operable with a system for constructing a composite signal, the translational switch comprising:
   a plurality of inputs comprising any combination of Ka band, Ku band and Intermediate Frequency (IF) band inputs, each input configured to receive a respective one of a plurality of input signals from a set of satellites;
   a first plurality of outputs;
   a second plurality of outputs;
   circuitry for switchably outputting, with one single frequency translation on any of the first plurality of outputs, a first frequency-translated version of a first of the plurality of input signals; and
   circuitry for switchably outputting, with one single frequency translation on any of the second plurality of outputs,
   a second frequency-translated version of the first of the plurality of input signals.

2. The translational switch of claim 1, wherein the circuitry for switchably outputting, on any of the first plurality of outputs, a first frequency-translated version of the first of the plurality of input signals comprises:
   a first mixer, comprising:
      a first port coupled to receive the first of the plurality of input signals,
      a second port coupled to receive a first mixing frequency signal, and
      a third port for providing a first frequency-translated version of the first of the plurality of input signals; and
   a second mixer, comprising:
      a first port coupled to receive a second of the plurality of input signals,
      a second port coupled to receive the first mixing frequency signal, and a third port for providing a first frequency-translated version of the second of the plurality of input signals.

3. The translational switch of claim 2, wherein the circuitry for switchably outputting, on any of the second plurality of outputs a second frequency-translated version of the first of the plurality of input signals, comprises:
a third mixer, comprising
a first port coupled to receive the first of the plurality of input signals,
a second port coupled to receive a second mixing frequency signal, and
a third port for providing a second frequency-translated version of the first of the plurality of input signals; and
a fourth mixer, comprising
a first port coupled to receive the second of the plurality of input signals,
a second port coupled to receive the second mixing frequency signal, and
a third port for providing a second frequency-translated version of the second of the plurality of input signals.

4. The translational switch of claim 3,
wherein the first frequency-translated versions of the first and second of the plurality of input signals comprise downconverted, upper band versions of the first and second of the plurality of input signals, and
wherein the second frequency-translated versions of the first and second of the plurality of input signals comprise downconverted, lower band versions of the first and second of the plurality of input signals.

5. The translational switch of claim 3, wherein each of the first, second, third and fourth mixers are operable as downconverting mixers.

6. The translational switch of claim 3, wherein each of the first and second mixing frequency signals are generated by an oscillator selected from the group consisting of a PLL-controlled oscillator, and a dielectric resonator oscillator.

7. The translational switch of claim 3,
wherein each of the first and second of the plurality of input signals comprises a Ku-band signals originating from the same satellite, and
wherein the first frequency-translated version of the first and second of the plurality of input signals, and the second frequency-translated version of the first and second of the plurality of input signals each comprises an L-band signal.

8. The translational switch of claim 1, wherein the translational switch is monolithically formed on an integrated circuit.

9. The translational switch of claim 7, wherein the oscillators are located externally from the translational switch.

10. A system for constructing a composite signal, comprising:
a first translational switch, comprising
a first plurality of inputs, comprising Ka band, Ku band and Intermediate Frequency (IF) band inputs, configured to receive a respective first plurality of signals from a set of satellites,
a first plurality of outputs, and
a second plurality of outputs;
wherein the first translational switch is configured to switchably output with one single frequency translation, on any of the first plurality of outputs, a first frequency-translated version a first of the first plurality of input signals, and
wherein the first translational switch is further configured to switchably output with one single frequency translation on any one of the second plurality of outputs a second frequency-translated version of the first of the plurality of input signals; and
a second translational switch, comprising
a second plurality of inputs, comprising Ka band, Ku band and IF band inputs, configured to receive a respective second plurality of signals from the set of satellites,
a third plurality of outputs, and
a fourth plurality of outputs,
wherein the second translational switch is configured to switchably output, with one single frequency translation, on the third plurality of outputs a first frequency-translated version of a first of the second plurality of input signals, and wherein the second translational switch is further configured to switchably output, with one single frequency translation, on the fourth plurality of outputs a second frequency-translated version of the first of the second plurality of input signals; and
an IF band output combining network coupled to each of the first translational switch outputs and to each of the second translational switch outputs, the IF band output combining network operable to construct a composite signal comprising the first frequency-translated version of the first of the first plurality of input signals and the first frequency-translated version of the first of the second plurality of input signals.

11. The system of claim 10, wherein the combining network comprises:
a plurality of first stage summers, each first stage summer comprising one output and at least two inputs, wherein each first stage summer is operable to combine (i) the first frequency-translated version of the first of the first plurality of input signals with the first frequency-translated version of the first of the second plurality of input signals to provide a summed first frequency-translated signal, or (ii) the second frequency-translated version of the first of the first plurality of input signals with the second frequency-translated version of the first of the second plurality of input signals to provide a summed second frequency-translated signal; and
a plurality of second stage summers, each second stage summer comprising one output and at least two inputs, each input coupled to a respective first stage summer output, wherein each second stage summer is operable to combine a summed first frequency-translated signal with a summed second frequency-translated signal.

12. The system of claim 11, wherein the combining network further comprises a filter coupled between at least one of the first stage summer outputs and one of the second stage summer inputs.

13. The system of claim 10,
wherein the first translation switch is configured to receive the first plurality of input signals from a first source;
wherein the second translation switch is configured to receive the second plurality of input signals from a second source; and
wherein the first translational switch is constructed on a first integrated circuit and wherein the second translational switch is constructed on a second integrated circuit which is separated from the first integrated circuit.

14. The system of claim 10, wherein the first and second translational switches are each configured to downconvert each of the first of the first plurality of input signals and the first of the second plurality of input signals to a first frequency-translated version of the signal and a second frequency-translated version of the signal, whereby said first frequency-translated version of the signal comprises an upper band of the downconverted signal, and the second frequency-translated version of the signal comprises a lower band of the downconverted signal.

15. A translational switch operable with a system for constructing a composite signal, the translational switch, comprising:
   a first input for receiving a first of a plurality of Ka band Ku band or IF band input signals from a set of satellites;
   a second input for receiving a second of the plurality of Ka band Ku band or IF band input signals from the set of satellites;
   a first mixer comprising:
      a first port coupled to receive the first of the plurality of input signals a second port coupled to receive a first mixing frequency signal, and
      a third port for providing a first frequency-translated version of the first of the plurality of input signals;
   a second mixer comprising:
      a first port coupled to receive the second of the plurality of input signals,
      a second port coupled to receive the first mixing frequency signal, and
      a third port for providing a first frequency-translated version of the second of the plurality of input signals;
   a third mixer comprising:
      a first port coupled to receive the first of the plurality of input signals,
      a second port coupled to receive a second mixing frequency signal, and
      a third port for providing a second frequency-translated version of the first of the plurality of input signals;
   a fourth mixer comprising:
      a first port coupled to receive the second of the plurality of input signals,
      a second port coupled to receive the second mixing frequency signal, and
      a third port for providing a second frequency-translated version of the second of the plurality of input signals;
   a first switch coupled to receive each of the first frequency-translated versions of the first and the second of the plurality of input signals, the first switch operable to selectively couple either: (i) any one of the first frequency-translated versions of the first and second plurality of input signals, or (ii) a null output signal, to any one or more of a plurality of first switch outputs; and
   a second switch coupled to receive each of the second frequency-translated versions of the first and the second of the plurality of input signals, the second output switch operable to selectively couple either: (i) any one of the second frequency-translated versions of the first and second plurality of input signals, or (ii) a null output signal, to any one or more of a plurality of second switch outputs,
   wherein the first switch and the second switch are coupled to a plurality of combiners directly coupled to a tuner to create the composite signal, and only one stage of frequency translation is performed between the composite signal and the first and second plurality of input signals.

* * * * *